(12) United States Patent
Sachkov

(10) Patent No.: US 12,613,321 B2
(45) Date of Patent: Apr. 28, 2026

(54) LIDAR SYSTEM AND A METHOD OF CALIBRATING THE LIDAR SYSTEM

(71) Applicant: YANDEX SELF DRIVING GROUP LLC, Moscow (RU)

(72) Inventor: Andrey Vladimirovich Sachkov, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 798 days.

(21) Appl. No.: 18/086,620

(22) Filed: Dec. 21, 2022

(65) Prior Publication Data

US 2023/0204740 A1 Jun. 29, 2023

(30) Foreign Application Priority Data

Dec. 24, 2021 (RU) ................................ 2021138718

(51) Int. Cl.
*G01S 7/497* (2006.01)
*G01S 7/481* (2006.01)
*G01S 17/931* (2020.01)

(52) U.S. Cl.
CPC ............ G01S 7/497 (2013.01); G01S 7/4817 (2013.01); *G01S 17/931* (2020.01)

(58) Field of Classification Search
None
See application file for complete search history.

(56) References Cited

U.S. PATENT DOCUMENTS 11,860,316 B1 * 1/2024 Zhang ................... G01S 17/931
2019/0154816 A1 5/2019 Hughes et al.
(Continued)

FOREIGN PATENT DOCUMENTS

CN 103975250 B 12/2016
EP 1965225 A2 9/2008
(Continued)

OTHER PUBLICATIONS

Russian Search Report dated Feb. 19, 2024 issued in respect of the counterpart Russian Patent Application No. RU 2021138718.
(Continued)

*Primary Examiner* — Eric L Bolda
(74) *Attorney, Agent, or Firm* — BCF LLP

(57) ABSTRACT

LIDAR systems and methods of calibrating the LIDAR systems. The LIDAR system has a light source, a scanning unit, and a detection unit. The scanning unit has a first reflective component for redirecting a light beam from the light source, a second actuatable reflective component for redirecting the light beam from the first reflective component towards the environment, and an adjustment mechanism for adjusting a position of the first reflective component relatively to the second reflective component along two degrees of freedom. The method includes emitting a light beam towards the first reflective component, actuating the first and second reflective components amongst a first and second plurality of positions respectively, detecting a self-flashing beam and, in response to the detecting the self-flashing beam, adjusting the position of the first reflective component relative to the second reflective component along at least one of the two degrees of freedom.

20 Claims, 10 Drawing Sheets

400

(56) References Cited

U.S. PATENT DOCUMENTS

| | | | |
|---|---|---|---|
| 2019/0235081 A1 | 8/2019 | Smits | |
| 2019/0302239 A1 | 10/2019 | Baier | |
| 2020/0033474 A1 | 1/2020 | Petit | |
| 2022/0357584 A1* | 11/2022 | Eggleston | ................. G06T 7/70 |
| 2023/0204739 A1* | 6/2023 | Orlov | ................... G01S 7/4817 |
| | | | 356/5.01 |

FOREIGN PATENT DOCUMENTS

| | | | |
|---|---|---|---|
| EP | 3859396 A1 | 8/2021 |
| RU | 2745882 C1 | 4/2021 |
| RU | 2020117983 A | 12/2021 |
| WO | 2017033009 A1 | 3/2017 |
| WO | 2019197894 A1 | 10/2019 |
| WO | 2020102406 A1 | 5/2020 |
| WO | 2020148567 A2 | 7/2020 |

OTHER PUBLICATIONS

European Search Report dated May 10, 2023 issued in respect of the European Patent Application No. 22216533.4.

* cited by examiner

900

930

908

970

953

950

952

960

971

972

973

902

906

975

951

980

1000

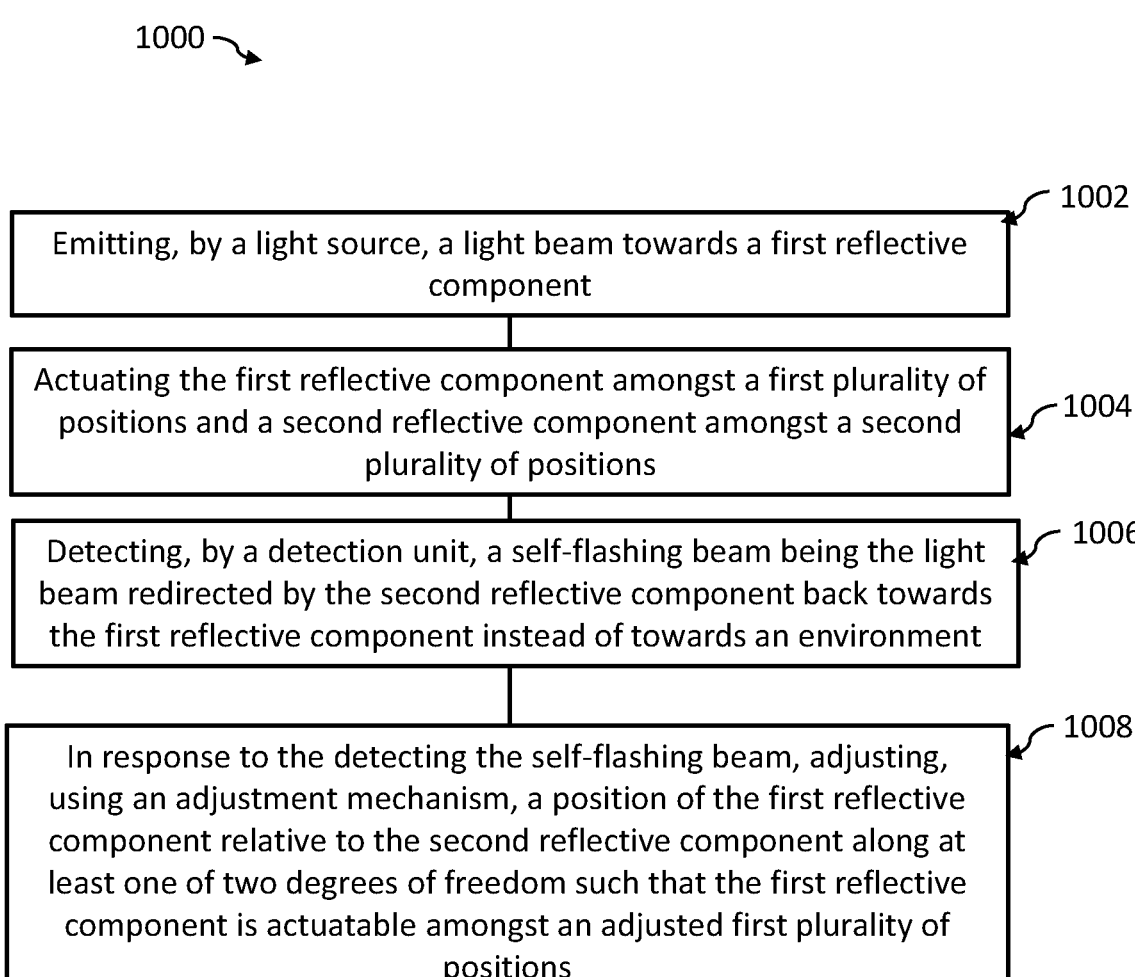

Emitting, by a light source, a light beam towards a first reflective component — 1002

Actuating the first reflective component amongst a first plurality of positions and a second reflective component amongst a second plurality of positions — 1004

Detecting, by a detection unit, a self-flashing beam being the light beam redirected by the second reflective component back towards the first reflective component instead of towards an environment — 1006

In response to the detecting the self-flashing beam, adjusting, using an adjustment mechanism, a position of the first reflective component relative to the second reflective component along at least one of two degrees of freedom such that the first reflective component is actuatable amongst an adjusted first plurality of positions — 1008

Figure 10

LIDAR SYSTEM AND A METHOD OF CALIBRATING THE LIDAR SYSTEM

CROSS-REFERENCE

The present application claims priority to Russian Patent Application No. 2021138718, entitled "LIDAR System and a Method of Calibrating the LIDAR System," filed Dec. 24, 2021, the entirety of which is incorporated by reference herein.

TECHNICAL FIELD

The present technology relates generally to LIDAR systems and, in particular, to methods of calibrating LIDAR systems.

BACKGROUND

Several computer-based navigation systems that are configured for aiding navigation and/or control of vehicles have been proposed and implemented in the prior art. These systems range from more basic map-aided localization-based solutions—i.e. use of a computer system to assist a driver in navigating a route from a starting point to a destination point; to more complex ones such as computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control systems implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control systems, which systems, upon detection of the vehicle (or other obstacles) in front of the moving vehicle, slow down or stop the vehicle.

Some of the more advanced systems provide for a fully autonomous driving of the vehicle without direct control from the operator (i.e. the driver). These autonomously driven vehicles include systems that can cause the vehicle to accelerate, brake, stop, change lane and self-park.

One of the main technical challenges in implementing the above systems is the ability to detect objects located around the vehicle. In one example, the systems may need the ability to detect the vehicle in front of the present vehicle (the present vehicle having the system onboard), which vehicle in front may pose a risk/danger to the present vehicle and may require the system to take a corrective measure, be it braking or otherwise changing speed, stopping or changing lanes. In another example, the systems may need to detect a pedestrian or animal crossing in front of the vehicle or otherwise in a surrounding environment of the vehicle.

LIDAR-based object detection generally comprises transmitting beams of light towards a region of interest, and detecting reflected light beams, such as from objects in the region of interest, to generate a representation of the region of interest including any objects. Lasers emitting pulses of light within a narrow wavelength are often used as the radiation (light) source. The position and distance of the object can be computed using inter alia Time of Flight calculations of the emitted and detected light beam. By computing such positions as "data points", a digital multi-dimensional representation of the surroundings can be generated.

A 3D representation is formed in part by reflected beams received by the LIDAR which generates data points representative of the surrounding objects. These points form clouds that represent the surrounding environment and form a 3D map. Each point in the point cloud is associated with coordinates in a coordinate space. Additionally, each point can be associated with some additional information such as the distance to the object from the self-driving vehicle. Other information may be associated with the points in the point cloud. In order to improve the volume and/or accuracy of points obtained by the LIDAR system, it is desired to calibrate the LIDAR system.

US Patent Application Publication No. 20190235081 discloses a scanning LIDAR system that measures a distance to a target that reflects light from a transmitter to a receiver.

SUMMARY

Therefore, there is a need for systems and methods which avoid, reduce or overcome the limitations of the prior art.

Light detection and ranging (LIDAR) systems are widely used in self-driving vehicles for detecting objects and navigating its surroundings. It collects points corresponding to light beams reflected from the objects in surroundings and uses these points for creating a cloud of points that serves as a 3D map representation of the surrounding environment.

A LIDAR system has inter alia a light source, a scanning unit, a detection unit, and a housing. Broadly, the light source generates light beams that are scanned by the scanning unit, and the detection unit captures returning light beams from the environment. The housing has a window for allowing light beams to exit/enter the LIDAR system and generally provides cover to internal components of the LIDAR system from other environmental light sources.

When a light beam returns to the detection unit from the environment, the detection unit captures this returning light beam and generates an electrical current. The electrical current can be used as an analog signal, for example, carrying information about location of objects in the surroundings. Thus, in some embodiments, the detection unit can be said to include a photodetector configured to generate an analog signal based on a received light signal. A photodetector can use one or more photodiodes for capturing the returning light beam.

Broadly speaking, a photodiode is a semiconductor p-n junction device that converts light into an electrical current. The current is generated when photons are absorbed in the photodiode. Photodiodes may contain optical filters and can have different surface areas, for example. In some cases, photodiodes can be exposed, while in other cases, they can be packaged with an optical fiber connection to allow light to reach the sensitive part of the device. Some diodes designed for use as photodiodes have a PIN junction, rather than a p-n junction, to increase the speed of response. A photodiode is designed to operate in reverse bias.

In the context of the present technology, developers have devised a scanning unit that can be calibrated during a normal operation of the LIDAR system. In other words, the LIDAR system continues to operate while the calibration process is performed. Continuity of operation of the LIDAR system during the calibration process is desirable. In at least one example, where the LIDAR system is used for operating a self-driving vehicle, this continuity of operation means that the self-driving vehicle does not need to stop for calibration and therefore may continue to safely operate in its environment.

The scanning unit comprises a first reflective component and a second reflective component. In at least one embodiment, the first reflective component may be a pivotable reflective component such as a pivotable galvo mirror and the second reflective component may be a rotatable multifaceted reflective component such as a multifaceted reflective prism. The scanning unit may produce the particular returning light beam mentioned above by actuating at least one of the first reflective component and the second reflective component.

The first reflective component may pivot and/or oscillate about a vertical axis and thereby spreads a light beam in a vertical plane. The second reflective component may rotate and/or spin and thereby spreads a light beam in a horizontal plane. When combined, the first reflective component and the second reflective component allow the scanning unit to have a scanning "pattern" in a 2D-plane including vertical and horizontal directions.

Developers of the present technology have realized that, in some circumstances, the light beam may return to the detection unit and be captured by the photodetector without having propagated in the environment, thereby causing a so-called "self-flashing effect" in the LIDAR system. Such self-flashing effect may occur, for example, when the emitted light beam falls on a reflective surface at a right angle (i.e. 90°). In the context of the present disclosure, such light beam may be referred to as a "self-flashing beam". It can be said that the self-flashing beam received by the photodetector has a relatively high energy compared to light beams returning from the environment. Indeed, the lights beams returning from the environment have their energy scattered due to optical alterations such as multiple reflection, dispersion, or polarization. The high energy of the light beams that cause the self-flashing effect on the LIDAR system may damage the photodetector (e.g. causing heating of a coating of the photodetector).

Moreover, as said light beams do not travel in the environment, the self-flashing effect results in a spot, or "gap", in the 3D map representation of the surrounding environment. Developers of the present technology have devised methods for calibrating a LIDAR system. In the context of the present technology, during the calibration process, a light source emits a light beam towards the first reflective component of a scanning unit of the LIDAR system and can detect an occurrence of the self-flashing effect. More particularly, during the calibration process, the scanning unit is configured to actuate the first reflective component amongst a first plurality of positions and the second reflective component amongst a second plurality of positions. For example, a detection unit may receive a self-flashing beam when the light beam is redirected by the second reflective component back towards the first reflective component instead of towards the environment. In response to detecting the self-flashing beam, an adjustment mechanism of the scanning unit adjusts a position of the first reflective component relative to the second reflective component along at least one of two degrees of freedom such that the first reflective component is actuatable amongst an adjusted plurality of positions. The position of the first reflective component relative to the second reflective component may be adjusted by the adjustment mechanism until no self-flashing beam is detected for each of the adjusted plurality of positions of the first reflective component. As a result, the light beams emitted by the light source may not fall at a right angle on the second reflective component after being redirected by the first reflective component when in the adjusted plurality of positions, thereby preventing the self-flashing effect from occurring in the LIDAR system.

Developers of the present technology have also realized that during extensive use of the LIDAR system, operational parameters of the scanning unit (such as relative position of the first and second reflective components) may deteriorate and/or change based on inter alia moisture, temperature, movement, etc. Consequently, it is desired to continuously calibrate and/or adjust the position of the first reflective component relative to the second reflective component along at least one of the two degrees of freedom for ensuring the quality of data generated by the LIDAR system.

In a first broad aspect of the present technology, there is provided a method of calibrating a Light detection and ranging (LIDAR) system, the LIDAR system mountable to a Self-driving car (SDC) operating in an environment, the LIDAR system having a light source, a detection unit, and a scanning unit, the scanning unit including a first reflective component for redirecting a light beam from the light source, the first reflective component being actuatable amongst a first plurality of positions, a second actuatable reflective component for redirecting the light beam from the first reflective component towards the environment, the second reflective component being actuatable amongst a second plurality of positions, and an adjustment mechanism for adjusting a position of the first reflective component along two degrees of freedom. The method comprises, during calibration of the LIDAR system, emitting, by the light source, the light beam towards first reflective component, actuating the first reflective component amongst the first plurality of positions and the second reflective component amongst the second plurality of positions, detecting, by the detection unit, a self-flashing beam being the light beam redirected by the second reflective component back towards the first reflective component instead of towards the environment, and in response to the detecting the self-flashing beam, adjusting, using the adjustment mechanism, the position of the first reflective component relative to the second reflective component along at least one of the two degrees of freedom such that the first reflective component is actuatable amongst an adjusted first plurality of positions.

In some embodiments of the method, the method further comprises emitting, by the light source, an other light beam towards first reflective component, actuating the first reflective component amongst the adjusted first plurality of positions and the second reflective component amongst the second plurality of positions.

In some embodiments of the method, the method further comprises detecting, by the detection unit, an other self-flashing beam being the other light beam redirected by the second reflective component back towards the first reflective component instead of towards the environment, and in response to the detecting the other self-flashing beam, adjusting, by the adjustment mechanism, the position of the first reflective component relative to the second reflective component along the at least one of the two degrees of freedom such that the first reflective component is actuatable amongst an other adjusted first plurality of positions.

In some embodiments of the method, the method further comprises determining that no light beam is redirected by the second reflective component back towards the first reflective component instead of towards the environment, and use the adjusted plurality of positions for the first reflective component during operation of the LIDAR system.

5

6

In some embodiments of the method, the first reflective component is a galvo mirror pivotable about a pivoting axis.

In some embodiments of the method, the adjusting comprises adjusting, using the adjustment mechanism, the pivoting axis of the galvo mirror along the at least one of the two degrees of freedom such the galvo mirror is pivotable amongst the adjusted first plurality of positions about an adjusted pivoting axis.

In some embodiments of the method, the second reflective component is a multifaceted prism.

In some embodiments of the method, the detecting the self-flashing beam comprises acquiring by the detection unit a returning light beam with an energy above a pre-determined threshold.

In some embodiments of the method, the adjusting the position of the first reflective component along the at least one of the two degrees of freedom comprises adjusting, using the adjustment mechanism, the position of the first reflective component along both of the two degrees of freedom.

In some embodiments of the method, the adjusting comprises adjusting, using the adjustment mechanism, the position of the second reflective component relative to the LIDAR system along a third degree of freedom such that the second reflective component is actuatable amongst an adjusted second plurality of positions.

In some embodiments of the method, one of the two degrees of freedom is an adjustment of the relative position of the first reflective component with respect to the second reflective component.

In some embodiments of the method, one of the two degrees of freedom is an adjustment of the relative position of the first reflective component with respect to an axis of the light beam emitted by the light source towards the first reflective component.

In another broad aspect of the present technology, there is provided a Light detection and ranging (LIDAR) system mounted to a Self-driving car (SDC) operating in an environment, the LIDAR system having a light source, a scanning unit, a detection unit, and a controller. The scanning unit comprises a first reflective component for redirecting a light beam from the light source, the first reflective component being actuatable amongst a first plurality of positions, a second actuatable reflective component for redirecting the light beam from the first reflective component towards the environment, the second reflective component being actuatable amongst a second plurality of positions, and an adjustment mechanism for adjusting a position of the first reflective component relatively to the second reflective component along two degrees of freedom. During calibration of the LIDAR system, the controller is configured to cause the light source to emit the light beam towards the first reflective component, cause the first reflective component to actuate amongst the first plurality of positions and the second reflective component amongst the second plurality of positions, detect, in collaboration with the detection unit, a self-flashing beam being the light beam redirected by the second reflective component back towards the first reflective component instead of towards the environment, and in response to a detection of the self-flashing beam, cause the adjustment mechanism to adjust the first reflective component relative to the second reflective component along at least one of the two degrees of freedom such that the first reflective component is actuatable amongst an adjusted first plurality of positions.

In some embodiments of the system, the controller is further configured to cause the light source to emit another light beam towards first reflective component, cause the first reflective component to actuate amongst the adjusted first plurality of positions and the second reflective component to actuate amongst the second plurality of positions.

In some embodiments of the system, the controller is further configured to detect, in collaboration with the detection unit, an other self-flashing beam being the other light beam redirected by the second reflective component back towards the first reflective component instead of towards the environment, and in response to the detecting the other self-flashing beam, cause the adjustment mechanism to adjust the position of the first reflective component relative to the second reflective component along the at least one of the two degrees of freedom such that the first reflective component is actuatable amongst an other adjusted first plurality of positions.

In some embodiments of the system, the controller is further configured to determine that no light beam is redirected by the second reflective component back towards the first reflective component instead of towards the environment, and use the adjusted plurality of positions for the first reflective component during operation of the LIDAR system.

In some embodiments of the system, the first reflective component is a galvo mirror pivotable about a pivoting axis.

In some embodiments of the system, the adjusting comprises adjusting, using the adjustment mechanism, the pivoting axis of the galvo mirror along the at least one of the two degrees of freedom such the galvo mirror is pivotable amongst the adjusted first plurality of positions about an adjusted pivoting axis.

In some embodiments of the system, the second reflective component is a multifaceted prism.

In some embodiments of the system, the controller detects the self-flash beam upon acquiring, by the detection unit, a returning light beam with an energy above a pre-determined threshold.

In some embodiments of the system, upon adjusting the position of the first reflective component along the at least one of the two degrees of freedom, the adjustment mechanism is configured to adjust the position of the first reflective component along both of the two degrees of freedom.

In some embodiments of the system, in response to a detection of the self-flashing beam, the controller is further configured to adjust the position of the second reflective component along at least a third degree of freedom such that the second reflective component is actuatable amongst an adjusted second plurality of positions.

In the context of the present specification, the term "light source" broadly refers to any device configured to emit radiation such as a radiation signal in the form of a beam, for example, without limitation, a light beam including radiation of one or more respective wavelengths within the electromagnetic spectrum. In one example, the light source can be a "laser source". Thus, the light source could include a laser such as a solid-state laser, laser diode, a high power laser, or an alternative light source such as, a light emitting diode (LED)-based light source. Some (non-limiting) examples of the laser source include: a Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the laser source may emit light beams in differing formats, such as light pulses, continuous wave (CW), quasi-CW, and so on. In some non-limiting examples, the laser source may include a laser diode configured to emit light at a wavelength between about 650 nm and 1150 nm. Alternatively, the light source may include a laser diode configured to emit light beams at a wavelength between about 900 nm and about 1000 nm, between about 950 nm and about 950 nm, between about 1300 nm and about 1600 nm, or in between any other suitable range. Unless indicated otherwise, the term "about" with regard to a numeric value is defined as a variance of up to 10% with respect to the stated value.

In the context of the present specification, an "output beam" may also be referred to as a radiation beam, such as a light beam, that is generated by the radiation source and is directed downrange towards a region of interest. The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" is radiation or light entering the system, generally after having been reflected from one or more objects in the ROI. The "input beam" may also be referred to as a radiation beam or light beam. By reflected is meant that at least a portion of the output beam incident on one or more objects in the ROI, bounces off the one or more objects. The input beam may have one or more parameters such as: time-of-flight (i.e., time from emission until detection), instantaneous power (e.g., power signature), average power across entire return pulse, and photon distribution/signal over return pulse period etc. Depending on the particular usage, some radiation or light collected in the input beam could be from sources other than a reflected output beam. For instance, at least some portion of the input beam could include light-noise from the surrounding environment (including scattered sunlight) or other light sources exterior to the present system.

In the context of the present specification, the term "surroundings" or "environment" of a given vehicle refers to an area or a volume around the given vehicle including a portion of a current environment thereof accessible for scanning using one or more sensors mounted on the given vehicle, for example, for generating a 3D map of the such surroundings or detecting objects therein.

In the context of the present specification, a "Region of Interest" may broadly include a portion of the observable environment of a LIDAR system in which the one or more objects may be detected. It is noted that the region of interest of the LIDAR system may be affected by various conditions such as but not limited to: an orientation of the LIDAR system (e.g. direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The ROI of LIDAR system may be defined, for example, by a plane angle or a solid angle. In one example, the ROI may also be defined within a certain distance range (e.g. up to 200 m or so).

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 10 is a schematic flowchart of a method executable in accordance with certain non-limiting embodiments of the present technology.

DETAILED DESCRIPTION

Figure 1:
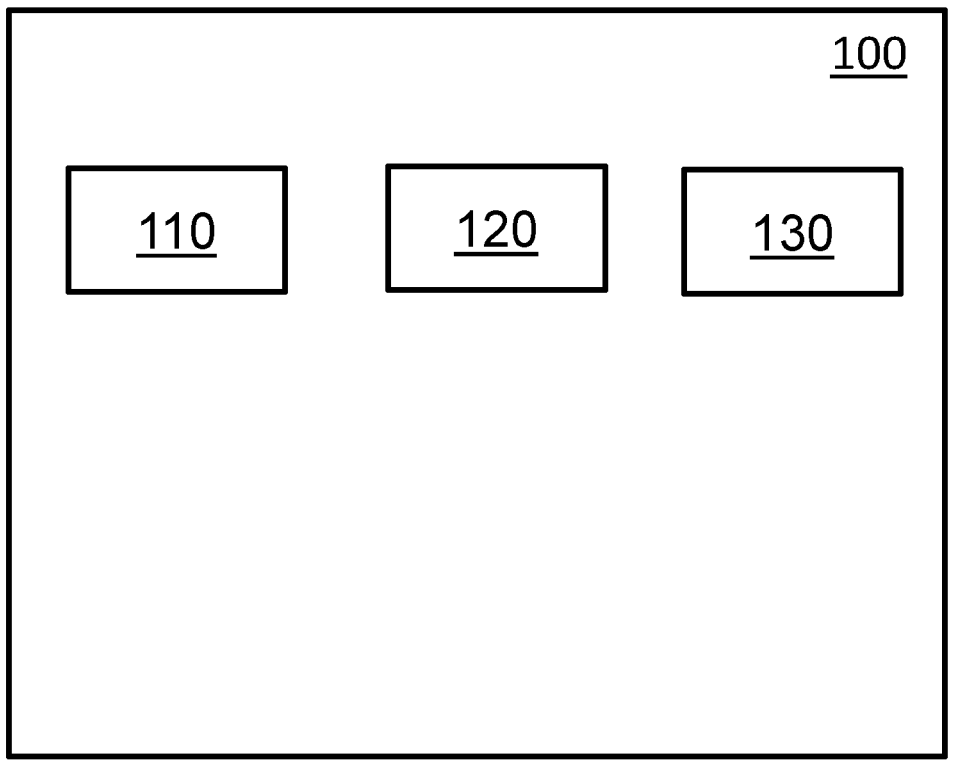
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a schematic diagram of a computer system 100 suitable for use with some implementations of the present technology. The computer system 100 includes various hardware components including one or more single or multi-core processors collectively represented by a processor 110, a solid-state drive 120, and a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Networked Computing Environment

Figure 2:
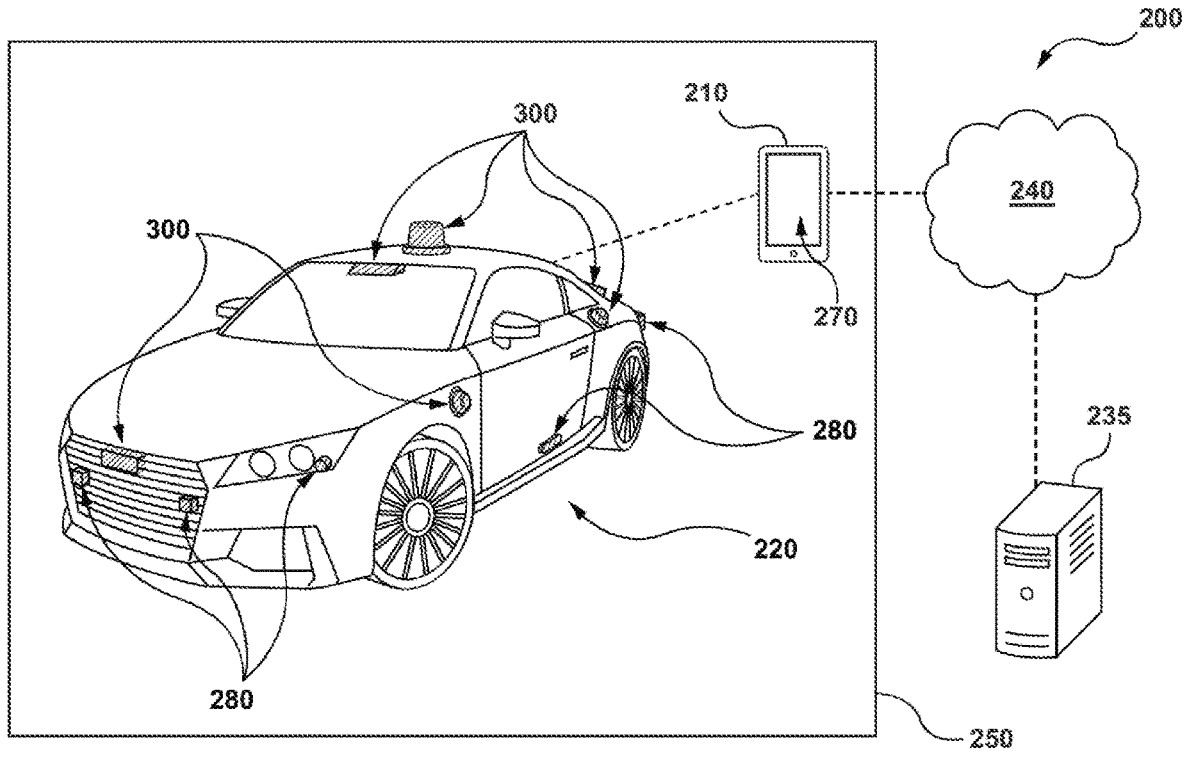
FIG. 2 depicts a schematic diagram of a networked computing environment being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 associated with a vehicle 220 and/or associated with a user (not depicted) who is associated with the vehicle 220 (such as an operator of the vehicle 220). The networked computing environment 200 also includes a server 235 in communication with the electronic device 210 via a communication network 240 (e.g. the Internet or the like, as will be described in greater detail herein below).

In some non-limiting embodiments of the present technology, the networked computing environment 200 could include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, to which the electronic device 210 is associated, could be any transportation vehicle, for leisure or otherwise, such as a private or commercial car, truck, motorbike or the like. Although the vehicle 220 is depicted as being a land vehicle, this may not be the case in each and every non-limiting embodiment of the present technology. For example, in certain non-limiting embodiments of the present technology, the vehicle 220 may be a watercraft, such as a boat, or an aircraft, such as a flying drone.

The vehicle 220 may be user operated or a driver-less vehicle. In some non-limiting embodiments of the present technology, it is contemplated that the vehicle 220 could be implemented as a Self-Driving Car (SDC). It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

According to the present technology, the implementation of the electronic device 210 is not particularly limited. For example, the electronic device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 could be implemented in a wireless communication device such as a mobile telephone (e.g. a smart-phone or a radio-phone). In certain embodiments, the electronic device 210 has a display 270.

The electronic device 210 could include some or all of the components of the computer system 100 depicted in FIG. 1, depending on the particular embodiment. In certain embodiments, the electronic device 210 is an on-board computer device and includes the processor 110, the solid-state drive 120 and the memory 130. In other words, the electronic device 210 includes hardware and/or software and/or firmware, or a combination thereof, for processing data as will be described in greater detail below.

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend, inter alia, on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some embodiments of the present technology, the server 235 is implemented as a computer server and could include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology, the functionality of the server 235 may be distributed and may be implemented via multiple servers (not shown).

In some non-limiting embodiments of the present technology, the processor 110 of the electronic device 210 could be in communication with the server 235 to receive one or more updates. Such updates could include, but are not limited to, software updates, map updates, routes updates, weather updates, and the like. In some non-limiting embodiments of the present technology, the processor 110 can also be configured to transmit to the server 235 certain operational data, such as routes travelled, traffic data, performance data, and the like. Some or all such data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alia, one or more camera-type sensor systems that are mounted to the vehicle 220 and communicatively coupled to the processor 110 of the electronic device 210. Broadly speaking, the one or more camera-type sensor systems may be configured to gather image data about various portions of the surroundings 250 of the vehicle 220. In some cases, the image data provided by the one or more camera-type sensor systems could be used by the electronic device 210 for performing object detection procedures. For example, the electronic device 210 could be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 could include one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

It should be noted that the plurality of sensor systems 280 could include additional types of sensor systems to those non-exhaustively described above and without departing from the scope of the present technology.

LIDAR System

According to the non-limiting embodiments of the present technology and as is illustrated in FIG. 2, the vehicle 220 is equipped with at least one Light Detection and Ranging (LIDAR) system, such as a LIDAR system 300, for gathering information about surroundings 250 of the vehicle 220. While only described herein in the context of being attached to the vehicle 220, it is also contemplated that the LIDAR system 300 could be a stand-alone operation or connected to another system.

Depending on the embodiment, the vehicle 220 could include more or fewer LIDAR systems 300 than illustrated. Depending on the particular embodiment, choice of inclusion of particular ones of the plurality of sensor systems 280 could depend on the particular embodiment of the LIDAR system 300. The LIDAR system 300 could be mounted, or retrofitted, to the vehicle 220 in a variety of locations and/or in a variety of configurations.

For example, depending on the implementation of the vehicle 220 and the LIDAR system 300, the LIDAR system 300 could be mounted on an interior, upper portion of a windshield of the vehicle 220. Nevertheless, as illustrated in FIG. 2, other locations for mounting the LIDAR system 300 are within the scope of the present disclosure, including on a back window, side windows, front hood, rooftop, front grill, front bumper or the side of the vehicle 220. In some cases, the LIDAR system 300 can even be mounted in a dedicated enclosure mounted on the top of the vehicle 220.

In some non-limiting embodiments, such as that of FIG. 2, a given one of the plurality of LIDAR systems 300 is mounted to the rooftop of the vehicle 220 in a rotatable configuration. For example, the LIDAR system 300 mounted to the vehicle 220 in a rotatable configuration could include at least some components that are rotatable 360 degrees about an axis of rotation of the given LIDAR system 300. When mounted in rotatable configurations, the given LIDAR system 300 could gather data about most of the portions of the surroundings 250 of the vehicle 220.

In some non-limiting embodiments of the present technology, such as that of FIG. 2, the LIDAR systems 300 is mounted to the side, or the front grill, for example, in a non-rotatable configuration. For example, the LIDAR system 300 mounted to the vehicle 220 in a non-rotatable configuration could include at least some components that are not rotatable 360 degrees and are configured to gather data about pre-determined portions of the surroundings 250 of the vehicle 220.

Irrespective of the specific location and/or the specific configuration of the LIDAR system 300, it is configured to capture data about the surroundings 250 of the vehicle 220 used, for example, for building a multi-dimensional map of objects in the surroundings 250 of the vehicle 220. Details relating to the configuration of the LIDAR systems 300 to capture the data about the surroundings 250 of the vehicle 220 will now be described.

It should be noted that although in the description provided herein the LIDAR system 300 is implemented as a Time of Flight LIDAR system—and as such, includes respective components suitable for such implementation thereof—other implementations of the LIDAR system 300 are also possible without departing from the scope of the present technology. For example, in certain non-limiting embodiments of the present technology, the LIDAR system 300 may also be implemented as a Frequency-Modulated Continuous Wave (FMCW) LIDAR system according to one or more implementation variants and based on respective components thereof as disclosed in a Russian Patent Application 2020117983 filed Jun. 1, 2020 and entitled "LIDAR DETECTION METHODS AND SYSTEMS"; the content of which is hereby incorporated by reference in its entirety.

Figure 3:
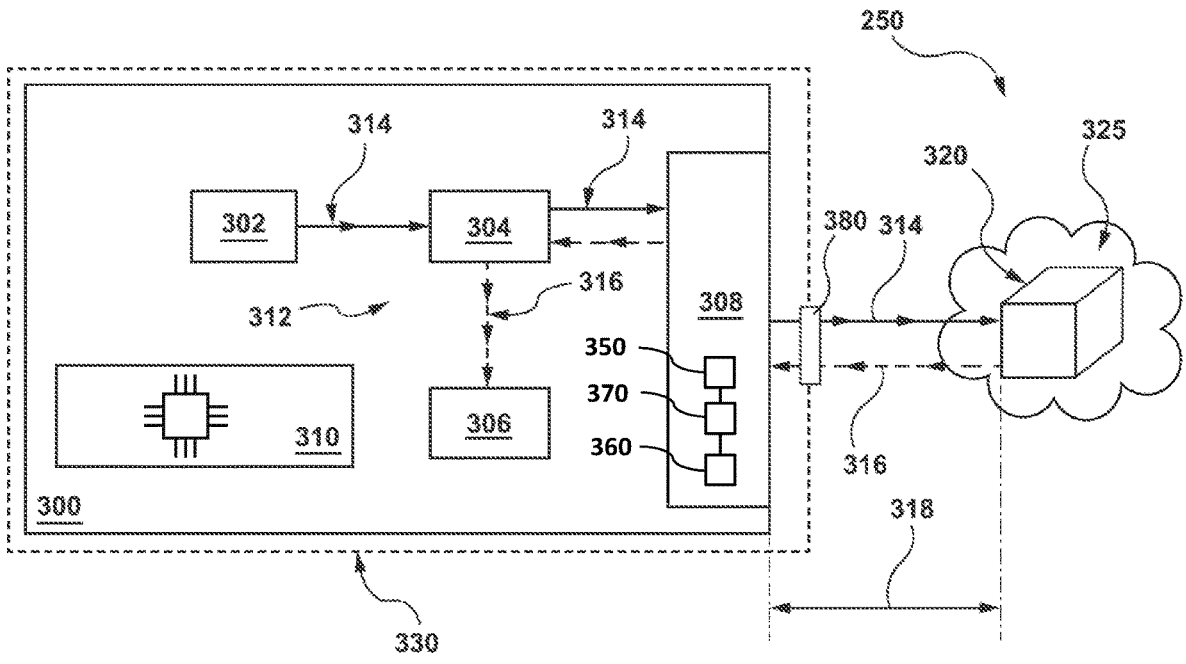
FIG. 3 depicts a schematic diagram of an example LIDAR system implemented in accordance with certain non-limiting embodiments of the present technology.

With reference to FIG. 3, there is depicted a schematic diagram of one particular embodiment of the LIDAR system 300 implemented in accordance with certain non-limiting embodiments of the present technology.

Broadly speaking, the LIDAR system 300 includes a variety of internal components including, but not limited to: (i) a light source 302 (also referred to as a "laser source" or a "radiation source"), (ii) a beam splitting element 304, (iii) a scanning unit 308 (also referred to as a "scanner", and "scanner assembly"), (iv) a detection unit 306 (also referred to herein as a "detection system", "receiving assembly", or a "detector"), and (v) a controller 310. It is contemplated that in addition to the components non-exhaustively listed above, the LIDAR system 300 could include a variety of sensors (such as, for example, a temperature sensor, a moisture sensor, etc.) which are omitted from FIG. 3 for sake of clarity.

In certain non-limiting embodiments of the present technology, one or more of the internal components of the LIDAR system 300 are disposed in a common housing 330 as depicted in FIG. 3. In some embodiments of the present technology, the controller 310 could be located outside of the common housing 330 and communicatively connected to the components therein. As it will become apparent from the description herein further below, the housing 330 has a window 380 towards the surroundings 250 of the vehicle 220 for allowing beams of light exiting the housing 330 and entering the housing 330.

Generally speaking, the LIDAR system 300 operates as follows: the light source 302 of the LIDAR system 300 emits pulses of light, forming an output beam 314; the scanning unit 308 scans the output beam 314 through the window 380 across the surroundings 250 of the vehicle 220 for locating/capturing data of a priori unknown objects (such as an object 320) therein, for example, for generating a multi-dimensional map of the surroundings 250 where objects (including the object 320) are represented in a form of one or more data points. The light source 302 and the scanning unit 308 will be described in more detail below.

As certain non-limiting examples, the object 320 may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Further, let it be assumed that the object 320 is located at a distance 318 from the LIDAR system 300. Once the output beam 314 reaches the object 320, the object 320 generally reflects at least a portion of light from the output beam 314, and some of the reflected light beams may return back towards the LIDAR system 300, to be received in the form of an input beam 316. By reflecting, it is meant that at least a portion of light beam from the output beam 314 bounces off the object 320. A portion of the light beam from the output beam 314 may be absorbed or scattered by the object 320.

Accordingly, the input beam 316 is captured and detected by the LIDAR system 300 via the detection unit 306. In response, the detection unit 306 is then configured to generate one or more representative data signals. For example, the detection unit 306 may generate an output electrical signal (not depicted) that is representative of the input beam 316. The detection unit 306 may also provide the so-generated electrical signal to the controller 310 for further processing. Finally, by measuring a time between emitting the output beam 314 and receiving the input beam 316 the distance 318 to the object 320 is calculated by the controller 310.

As will be described in more detail below, the beam splitting element 304 is utilized for directing the output beam 314 from the light source 302 to the scanning unit 308 and for directing the input beam 316 from the scanning unit to the detection unit 306.

Use and implementations of these components of the LIDAR system 300, in accordance with certain non-limiting embodiments of the present technology, will be described immediately below.

Light Source

The light source 302 is communicatively coupled to the controller 310 and is configured to emit light having a given operating wavelength. To that end, in certain non-limiting embodiments of the present technology, the light source 302 could include at least one laser pre-configured for operation at the given operating wavelength. The given operating wavelength of the light source 302 may be in the infrared, visible, and/or ultraviolet portions of the electromagnetic spectrum. For example, the light source 302 may include at least one laser with an operating wavelength between about 650 nm and 1150 nm. Alternatively, the light source 302 may include a laser diode configured to emit light at a wavelength between about 900 nm and about 1000 nm, between about 950 nm and about 950 nm, or between about 1300 nm and about 1600 nm. In certain other embodiments, the light source 302 could include a light emitting diode (LED).

The light source 302 of the LIDAR system 300 is generally an eye-safe laser, or put another way, the LIDAR system 300 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

According to certain non-limiting embodiments of the present technology, the operating wavelength of the light source 302 may lie within portions of the electromagnetic spectrum that correspond to light produced by the Sun. Therefore, in some cases, sunlight may act as background noise, which can obscure the light signal detected by the LIDAR system 300. This solar background noise can result in false-positive detections and/or may otherwise corrupt measurements of the LIDAR system 300. Although it may be feasible in some cases to increase a Signal-to-Noise Ratio (SNR) of the LIDAR system 300 by increasing the power level of the output beam 314, this may not be desirable in at least some situations. For example, it may not in some implementations be desirable to increase power levels of the output beam 314 to levels beyond eye-safe thresholds.

The light source 302 includes a pulsed laser configured to produce, emit, or radiate pulses of light with a certain pulse duration. For example, in some non-limiting embodiments of the present technology, the light source 302 may be configured to emit pulses with a pulse duration (e.g., pulse width) ranging from 10 ps to 100 ns. In other non-limiting embodiments of the present technology, the light source 302 may be configured to emit pulses at a pulse repetition frequency of approximately 100 kHz to 5 MHz or a pulse period (e.g., a time between consecutive pulses) of approximately 200 ns to 10 μs. Overall, however, the light source 302 can generate the output beam 314 with any suitable average optical power, and the output beam 314 may include optical pulses with any suitable pulse energy or peak optical power for a given application.

In some non-limiting embodiments of the present technology, the light source 302 could include one or more laser diodes, including but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the light source 302 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It is also contemplated that the light source 302 may include one or more laser diodes that are current-modulated to produce optical pulses.

In some non-limiting embodiments of the present technology, the light source 302 is generally configured to emit the output beam 314 that is a collimated optical beam, but it is contemplated that the beam produced could have any suitable beam divergence for a given application. Broadly speaking, divergence of the output beam 314 is an angular measure of an increase in beam cross-section size (e.g., a beam radius or beam diameter) as the output beam 314 travels away from the light source 302 or the LIDAR system 300. In some non-limiting embodiments of the present technology, the output beam 314 may have a substantially circular cross-section.

It is also contemplated that the output beam 314 emitted by light source 302 could be unpolarized or randomly polarized, could have no specific or fixed polarization (e.g., the polarization may vary with time), or could have a particular polarization (e.g., the output beam 314 may be linearly polarized, elliptically polarized, or circularly polarized).

In at least some non-limiting embodiments of the present technology, the output beam 314 and the input beam 316 may be substantially coaxial. In other words, the output beam 314 and input beam 316 may at least partially overlap or share a common propagation axis, so that the input beam 316 and the output beam 314 travel along substantially the same optical path (albeit in opposite directions). Nevertheless, in other non-limiting embodiments of the present technology, the output beam 314 and the input beam 316 may not be coaxial, or in other words, may not overlap or share a common propagation axis inside the LIDAR system 300, without departing from the scope of the present technology.

It should be noted that in at least some non-limiting embodiments of the present technology, the light source 302 could be rotatable, such as by 360 degrees or less, about the axis of rotation (not depicted) of the LIDAR system 300 when the LIDAR system 300 is implemented in a rotatable configuration. However, in other embodiments, the light source 302 may be stationary even when the LIDAR system 300 is implemented in a rotatable configuration, without departing from the scope of the present technology.

Beam Splitting Element

With continued reference to FIG. 3, there is further provided the beam splitting element 304 disposed in the housing 330. For example, as previously mentioned, the beam splitting element 304 is configured to direct the output beam 314 from the light source 302 towards the scanning unit 308. The beam splitting element 304 is also arranged and configured to direct the input beam 316 reflected off the object 320 to the detection unit 306 for further processing thereof by the controller 310.

However, in accordance with other non-limiting embodiments of the present technology, the beam splitting element 304 may be configured to split the output beam 314 into at least two components of lesser intensity including a scanning beam (not separately depicted) used for scanning the surroundings 250 of the LIDAR system 300, and a reference beam (not separately depicted), which is further directed to the detection unit 306.

In other words, in these embodiments, the beam splitting element 304 can be said to be configured to divide intensity (optical power) of the output beam 314 between the scanning beam and the reference beam. In some non-limiting embodiments of the present technology, the beam splitting element 304 may be configured to divide the intensity of the output beam 314 between the scanning beam and the reference beam equally. However, in other non-limiting embodiments of the present technology, the beam splitting element 304 may be configured to divide the intensity of the output beam 314 at any predetermined splitting ratio. For example, the beam splitting element 304 may be configured to use up to 80% of the intensity of the output beam 314 for forming the scanning beam, and the remainder of up to 20% of the intensity of the output beam 314—for forming the reference beam. In yet other non-limited embodiments of the present technology, the beam splitting element 304 may be configured to vary the splitting ratio for forming the scanning beam (for example, from 1% to 95% of the intensity of the output beam 314).

It should further be noted that some portion (for example, up to 10%) of the intensity of the output beam 314 may be absorbed by a material of the beam splitting element 304, which depends on a particular configuration thereof.

Depending on the implementation of the LIDAR system 300, the beam splitting element 304 could be provided in a variety of forms, including but not limited to: a glass prism-based beam splitter component, a half-silver mirror-based beam splitter component, a dichroic mirror prism-based beam splitter component, a fiber-optic-based beam splitter component, and the like.

Thus, according to the non-limiting embodiments of the present technology, a non-exhaustive list of adjustable parameters associated with the beam splitting element 304, based on a specific application thereof, may include, for example, an operating wavelength range, which may vary from a finite number of wavelengths to a broader light spectrum (from 1200 to 1600 nm, as an example); an income incidence angle; polarizing/non-polarizing, and the like.

In a specific non-limiting example, the beam splitting element 304 can be implemented as a fiber-optic-based beam splitter component that may be of a type available from OZ Optics Ltd. of 219 Westbrook Rd Ottawa, Ontario K0A 1L0 Canada. It should be expressly understood that the beam splitting element 304 can be implemented in any other suitable equipment.

Internal Beam Paths

As is schematically depicted in FIG. 3, the LIDAR system 300 forms a plurality of internal beam paths 312 along which the output beam 314 (generated by the light source 302) and the input beam 316 (received from the surroundings 250) propagate. Specifically, light propagates along the internal beam paths 312 as follows: the light from the light source 302 passes through the beam splitting element 304, to the scanning unit 308 and, in turn, the scanning unit 308 directs the output beam 314 outward towards the surroundings 250.

Similarly, the input beam 316 follows the plurality of internal beam paths 312 to the detection unit 306. Specifically, the input beam 316 is directed by the scanning unit 308 into the LIDAR system 300 through the beam splitting element 304, toward the detection unit 306. In some implementations, the LIDAR system 300 could be arranged with beam paths that direct the input beam 316 directly from the surroundings 250 to the detection unit 306 (without the input beam 316 passing through the scanning unit 308).

It should be noted that, in various non-limiting embodiments of the present technology, the plurality of internal beam paths 312 may include a variety of optical components. For example, the LIDAR system 300 may include one or more optical components configured to condition, shape, filter, modify, steer, or direct the output beam 314 and/or the input beam 316. For example, the LIDAR system 300 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

It is contemplated that in at least some non-limiting embodiments of the present technology, the given internal beam path and the other internal beam path from the plurality of internal beam paths 312 may share at least some common optical components, however, this might not be the case in each and every embodiment of the present technology.

Scanning Unit

Generally speaking, the scanning unit 308 steers the output beam 314 in one or more directions downrange towards the surroundings 250. The scanning unit 308 is communicatively coupled to the controller 310. As such, the controller 310 is configured to control the scanning unit 308 so as to guide the output beam 314 in a desired direction downrange and/or along a predetermined scan pattern. Broadly speaking, in the context of the present specification "scan pattern" may refer to a pattern or path along which the output beam 314 is directed by the scanning unit 308 during operation.

In certain non-limiting embodiments of the present technology, the controller 310 is configured to cause the scanning unit 308 to scan the output beam 314 over a variety of horizontal angular ranges and/or vertical angular ranges; the total angular extent over which the scanning unit 308 scans the output beam 314 is sometimes referred to as the field of view (FOV). It is contemplated that the particular arrangement, orientation, and/or angular ranges could depend on the particular implementation of the LIDAR system 300. The field of view generally includes a plurality of regions of interest (ROIs), defined as portions of the FOV which may contain, for instance, objects of interest. In some implementations, the scanning unit 308 can be configured to further investigate a selected region of interest (ROI) 325. The ROI 325 of the LIDAR system 300 may refer to an area, a volume, a region, an angular range, and/or portion(s) of the surroundings 250 about which the LIDAR system 300 may be configured to scan and/or can capture data.

It should be noted that a location of the object 320 in the surroundings 250 of the vehicle 220 may be overlapped, encompassed, or enclosed at least partially within the ROI 325 of the LIDAR system 300.

According to certain non-limiting embodiments of the present technology, the scanning unit 308 may be configured to scan the output beam 314 horizontally and/or vertically, and as such, the ROI 325 of the LIDAR system 300 may have a horizontal direction and a vertical direction. For example, the ROI 325 may be defined by 45 degrees in the horizontal direction, and by 45 degrees in the vertical direction. In some implementations, different scanning axes could have different orientations.

The scanning unit 308 includes a first reflective component 350, a second reflective component 360 and an adjustment mechanism 370 connected to the first reflective component 350 and/or the second reflective component 360. The first reflective component 350 is configured to redirect the output beam 314 from the beam splitting component towards the second reflective component 350 while spreading the output beam along a first axis. The second reflective component 360 is configured to redirect the output beam 314 from the first reflective component 350 towards the surroundings 250 (through the window 380 of the housing 330) while spreading the output beam along a second axis. The second axis can be perpendicular and/or orthogonal to the first axis. As such, so-redirecting and so-spreading the output beam 314 by the combination of the first reflective component 350 and the second reflective component 360 allows to scan the surroundings 250 of the vehicle 220 along at least two perpendicular/orthogonal axes.

For example, the output beam 314 may be spread by the first reflective component 350 along a first axis and by the second reflective component 360 along a second axis. In one embodiment, the first axis may be a vertical axis while the second axis may be a horizontal axis. In another embodiment, the first axis may be a horizontal axis while the second axis may be a vertical axis.

In certain non-limiting embodiments of the present technology, a given scanning unit may further include a variety of other optical components and/or mechanical-type components for performing the scanning of the output beam. For example, the given scanning unit may include one or more mirrors, prisms, lenses, MEM components, piezoelectric components, optical fibers, splitters, diffractive elements, collimating elements, and the like. It should be noted that the scanning unit may also include one or more additional actuators (not separately depicted) driving at least some of the other optical components to rotate, tilt, pivot, or move in an angular manner about one or more axes, for example.

The LIDAR system 300 may thus make use of the predetermined scan pattern to generate a point cloud substantially covering the ROI 325 of the LIDAR system 300. Again, this point cloud of the LIDAR system 300 may be used to render a multi-dimensional map of objects in the surroundings 250 of the vehicle 220.

The adjustment mechanism 370 is configured to adjust a position of the first reflective component 350 relatively to the second reflective component 360. In the context of the present disclosure, the position of the first reflective component 350 may encompass a relative position (e.g. a relative distance) and an orientation (i.e. angular position). The adjustment mechanism 370 may comprise, for example and without limitation, servomotors adapted to cause a displacement (e.g. translation along one or more linear or nonlinear directions and/or rotations about one or more axes) of the first reflective component 350 relatively to the second reflective component 360. In this embodiment, the adjustment mechanism 370 adjusts the position of the first reflective component 350 relatively to the second reflective component 360 along two degrees of freedom. The two degrees of freedom are described in greater details hereafter in accordance with various embodiments of the present technology.

Embodiments where the adjustment mechanism 370 is also connected to the light source 302, the 304 and/or the 306 such that relative position of those components may be adjusted are also contemplated.

Figure 4:
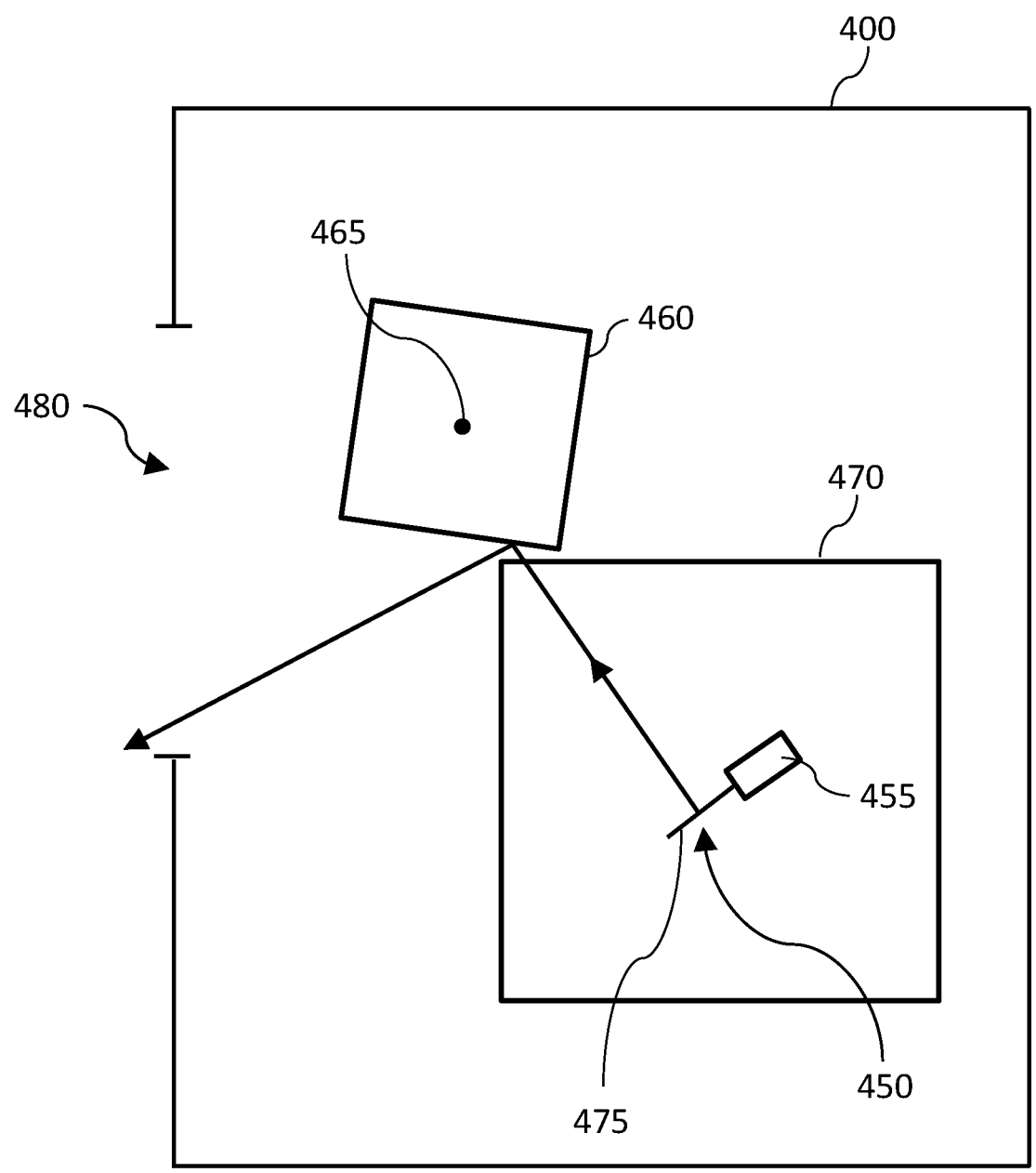
FIG. 4 depicts a schematic diagram of an example scanning unit in a first arrangement and implemented in accordance with certain non-limiting embodiments of the present technology.

With reference to FIG. 4, there is depicted a schematic diagram of one particular embodiment of the LIDAR system 400, viewed from top, implemented in accordance with certain non-limiting embodiments of the present technology. The LIDAR system 400 has a housing 430 with a window 480. Although not illustrated in FIG. 4, the window 480 may be covered by a transparent screen. Inside the housing 480, the LIDAR system 400 has a light source, a beam splitting component, and a detection unit.

The light source generates a light beam that is directed to a pivotable galvo mirror 450 (e.g., first reflective component), which is illustrated in FIG. 4 and may rotate in a number of positions about a pivoting axis 475. In this embodiment, the LIDAR system 400 comprises a motor 455, referred to as a "galvo-motor", configured to actuate the pivotable galvo mirror 450 around the pivoting axis 475. As such, it can be said that the pivotable galvo mirror 450 is actuatable amongst a plurality of angular positions by the galvo-motor 455. Said different positions may be referred as "angular positions" of the pivotable galvo mirror 450 that may vary, for example and without limitation, within an angular range of 40° (e.g. from −25° to +15° in this illustrative embodiment). However, the angular range is limited by the characteristics of the scanning unit 308. In other words, if the pivotable galvo mirror 450 has a larger rotation range and a rotatable reflective prism 460 has a sufficient height, then the angular range may be higher. The rotatable reflective prism 460 is described in greater details herein further below. As such the angular range may vary depending inter alia on the height of the rotatable reflective prism 460 and a rotation range of the pivotable galvo mirror 450. In an alternative embodiment, the pivotable galvo mirror 450 is a microelectromechanical system (MEMS) that may be, for example and without limitation, electrically connected to a piezoelectric device configured to use piezoelectricity to generate motion and actuate the pivotable galvo mirror 450.

In this embodiment, the light source, the beam splitting component, and the detection unit are disposed below the galvo mirror 450 (the light source, the beam splitting component, and the detection unit are thus not visible on FIGS. 4 to 8). Depending on an orientation of the pivotable galvo mirror 450 in a respective position thereof relative to the incoming light beam, the light beam will be spread along a first axis towards a rotatable reflective prism 460 (e.g. second reflective component). The rotatable reflective prism 460 is rotatable about an axis 465 such that is can be said that the rotatable reflective prism 460 is actuatable amongst a plurality of positions (i.e. angular positions in this example). In this illustrative embodiment, the rotatable reflective prism 460 has four reflective surfaces. It is contemplated that the rotatable reflective prism 460 defines another number of reflective surfaces (e.g. six reflective surfaces) in alternative embodiments.

In use, the light beams that are redirected by the pivotable galvo mirror 450 towards the rotatable reflective prism 460, contact one of the reflective sides of the rotatable reflective prism 460, and are redirected along a second axis towards the window 480. Depending on an angle between the incoming light beam from the pivotable galvo mirror 450 and a corresponding one of the reflective sides of the rotatable reflective prism 460 at a given moment in time (i.e., a respective position of the rotatable reflective prism 460 about its rotational axis), the light beam will be spread along the second axis towards the window 480. In combination, the pivotable galvo mirror 450 and the rotatable reflective prism 460 can scan light beams along two different axes forming a 2D scanning pattern.

Figure 5:
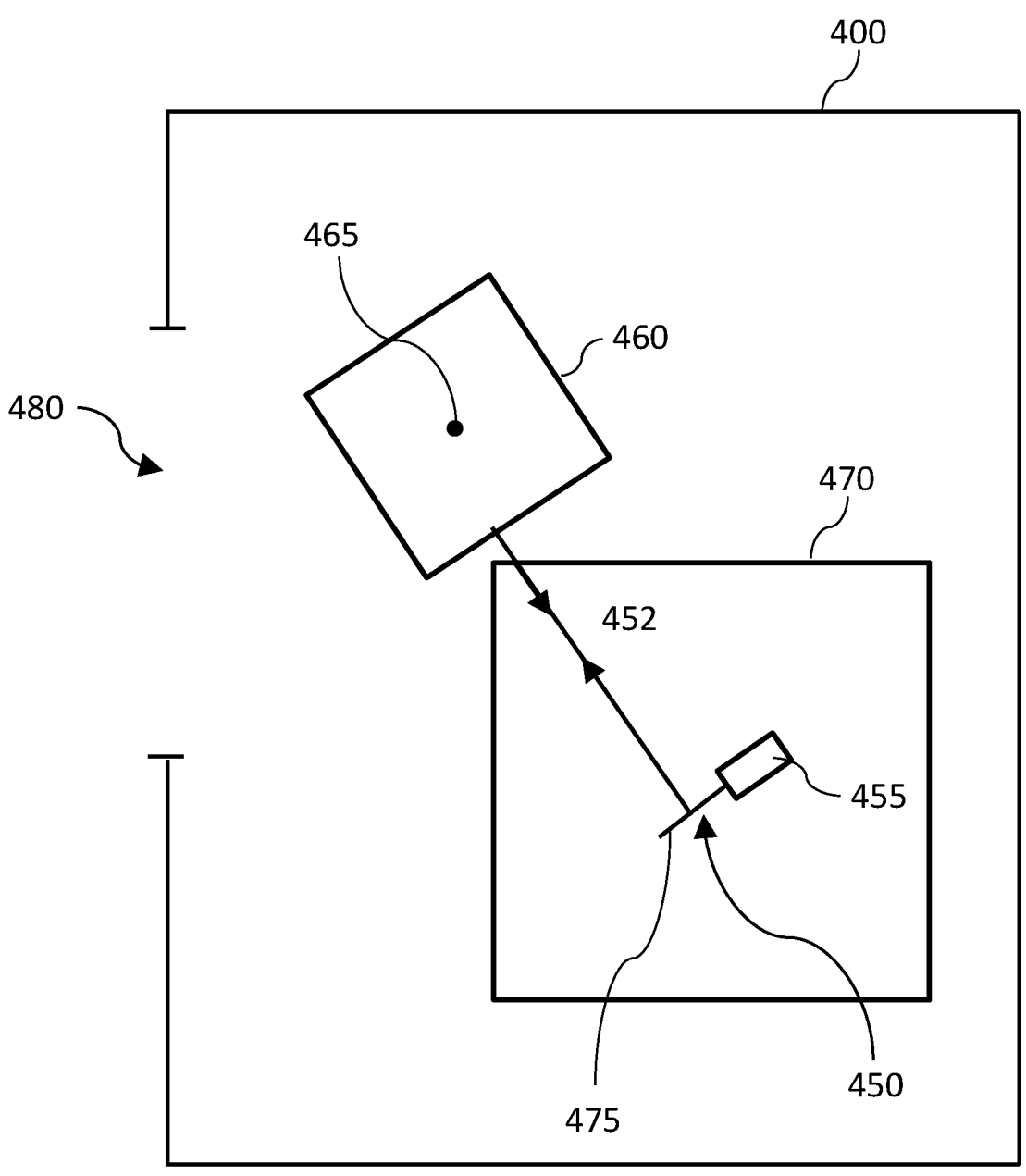
FIG. 5 depicts a schematic diagram of the example scanning unit of FIG. 4 in a second arrangement.

With reference to FIG. 5, the pivotable galvo mirror 450 may be in one or more positions in which, upon rotation of the rotatable reflective prism 460 around the rotation axis 465, the light beam falls on a reflective surface of the rotatable reflective prism 460 at a right angle, thereby causing a self-flashing effect. In this embodiment, the rotatable reflective prism 460 has four reflective surfaces. In an alternative embodiment, the rotatable reflective prism 460 may have six reflective surfaces. In yet alternative embodiments, the rotatable reflective prism 460 may have a different number of reflective surfaces. The illustrative example of arrangement of the LIDAR system 400 of FIGS. 4 and 5 are such that the rotatable reflective prism 460 has rotated about the rotation axis 465 from FIG. 4 to FIG. 5.

As previously described, such reflection at a right angle as depicted on FIG. 5 may damage the detection unit and generate a "blind spot" in the FOV, thereby causing a gap in the 3D map representation of the surrounding environment. In one aspect, the present technology provides a calibration of the LIDAR system 400 that may be executed such that no self-flashing effect occurs in response to the pivotable galvo mirror 450 being actuated in the angular range by the galvo-motor 455, thereby ensuring the quality, and completeness, of data generated by the LIDAR system 400.

In this embodiment, the LIDAR system 400 comprises an adjustment mechanism 470 configured for adjusting a position (i.e. relative position and orientation) of the pivotable galvo mirror 450 relative to the rotatable reflective prism 460 along two degrees of freedom. Alternative embodiments where a higher number of degrees of freedom is provided by the adjustment mechanism 470 to the pivotable galvo mirror 450 are also contemplated.

More specifically and as it will be described in greater details herein further below, the adjustment mechanism 470 adjusts the position of the pivotable galvo mirror 450 relative to other components of the LIDAR system 400. Alternative embodiments where the adjustment mechanism 470 adjusts the position of the rotatable reflective prism 460 (e.g. a position of the rotation axis 465) relative to other components of the LIDAR system 400 are also contemplated.

Figure 6:
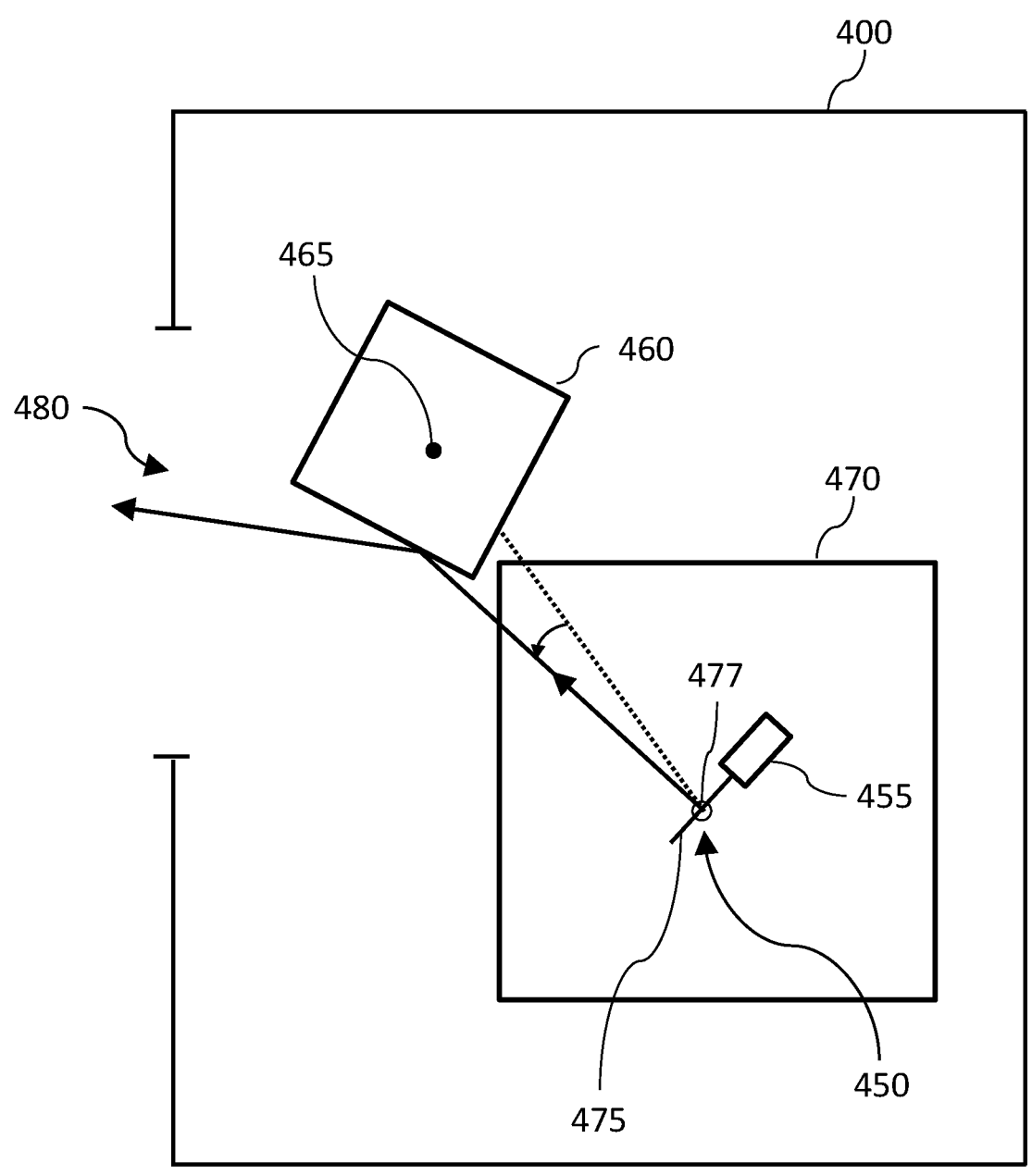
FIG. 6 depicts a schematic diagram of the example scanning unit of FIG. 4 in a third arrangement.

With reference to FIG. 6, the position of the pivotable galvo mirror 450 has been adjusted along a first degree of freedom by the adjustment mechanism 470. In this embodiment, the first degree of freedom is a rotation about an axis 477 of the light beam emitted by the light source (or simple "light source beam axis") towards the pivotable galvo mirror 450. In the illustrative example of FIG. 6, the light source beam axis 477 is orthogonal to a plane of FIG. 6 and the pivotable galvo mirror 450 has been rotated counter-clockwise about the light source beam axis 477, although pivotable galvo mirror 450 may rotate clockwise about the light source beam axis 477 in other scenarios. It can be said that this adjustment of the pivotable galvo mirror 450 relative to the light source beam axis 477 along the first degree of freedom causes a shifting of the FOV of the LIDAR system 400 relative to the blind spot.

Figure 7:
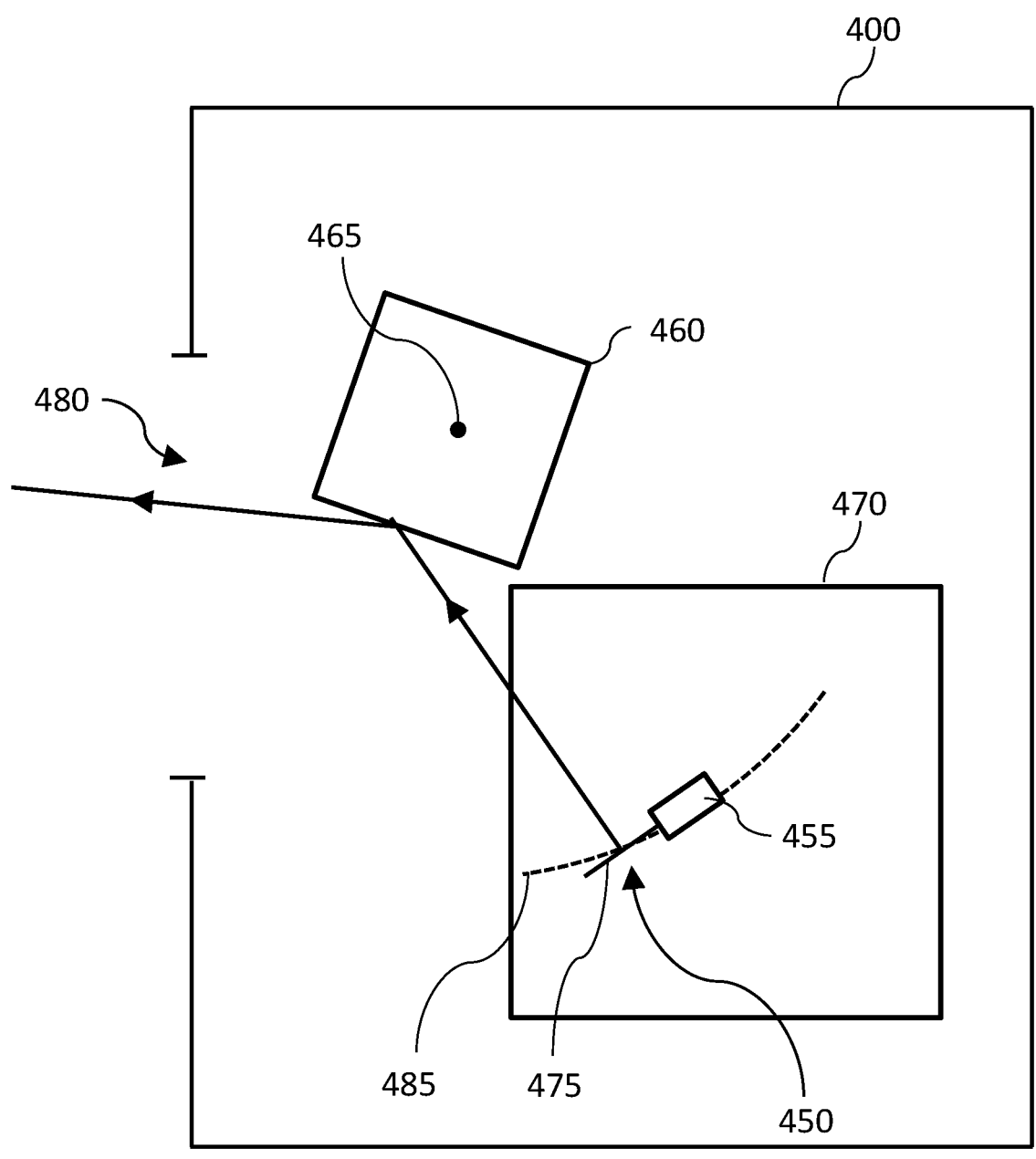
FIG. 7 depicts a schematic diagram of the example scanning unit of FIG. 4 in a fourth arrangement.
Figure 8:
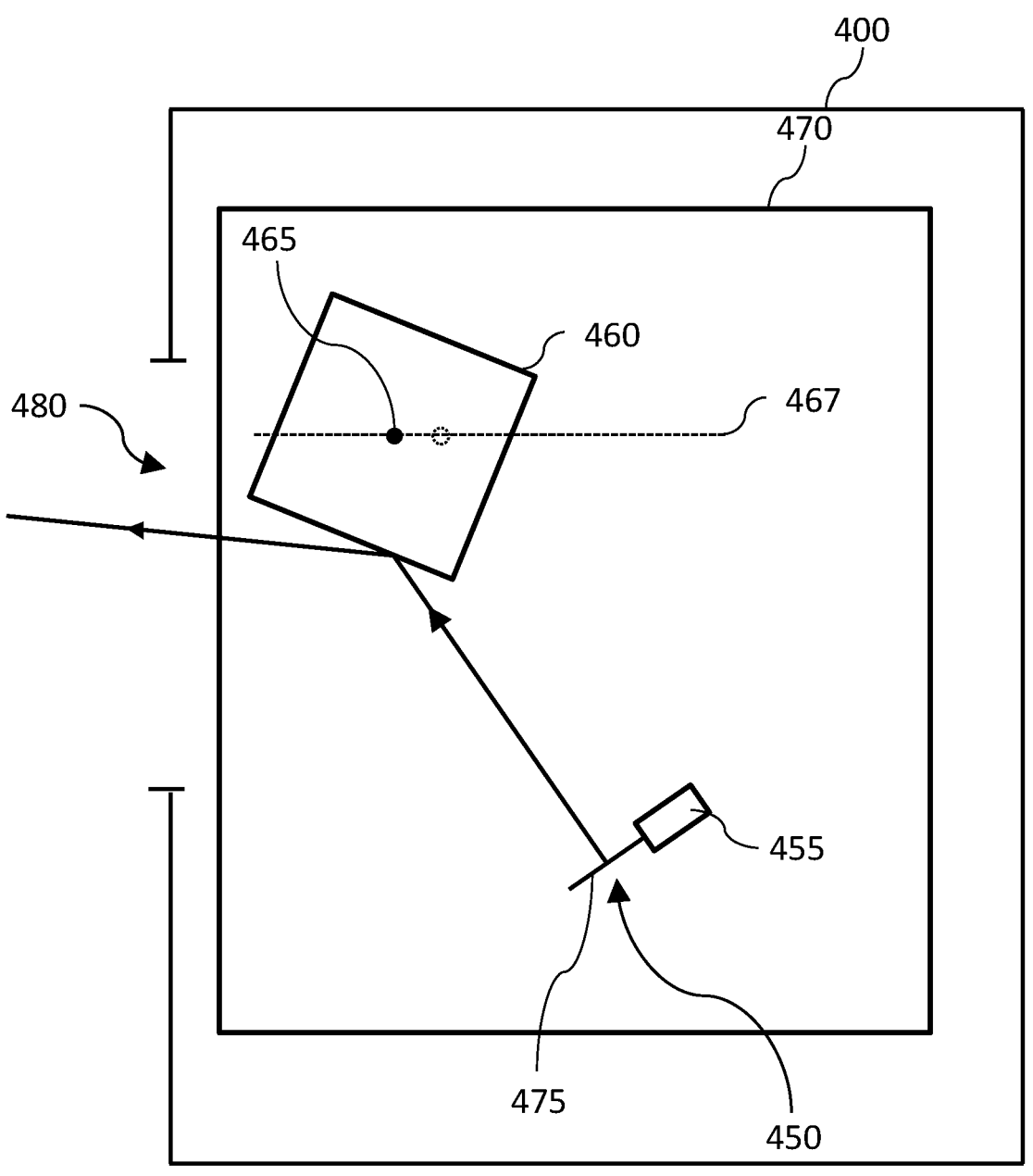
FIG. 8 depicts a schematic diagram of the example scanning unit of FIG. 4 in a fifth arrangement.

In this embodiment, with reference to FIG. 7, the position of the pivotable galvo mirror 450 has been adjusted along a second degree of freedom by the adjustment mechanism 470. In this embodiment, the first degree of freedom is a translation, caused by the adjustment mechanism 470, of the pivotable galvo mirror 450 along a circular path 485 defined around the rotation axis 465 of the rotatable reflective prism 460. In the illustrative example of FIG. 7, the pivotable galvo mirror 450 has been moved clockwise along the circular path 485. It can be said that this adjustment of the pivotable galvo mirror 450 along the second degree of freedom causes a shifting of the FOV of the LIDAR system 400 relative to the surrounding environment. In this embodiment, the adjustment of the pivotable galvo mirror 450 along the second degree of freedom causes may also cause a modification of a size of the blind spot.

In the same or another embodiment, a position and/or an orientation of the rotation axis 465 may also be adjusted by the adjustment mechanism 470 along at least one degree of freedom. In the illustrative embodiment of FIG. 8, the adjustment mechanism 470 is connected to the rotatable reflective prism 460 such that the rotation axis 465 may be actuated. Alternative embodiments where another adjustment mechanism (i.e. independent from the adjustment mechanism 470) adjusts the position and/or the orientation of the rotation axis 465 are contemplated.

In this embodiment, the at least one degree of freedom is a translation of the rotation axis 465 along a straight path 467, such that the at least one degree of freedom may be referred to as a "third degree of freedom". In the illustrative example of FIG. 8, the rotation axis 465 is orthogonal to a plane of FIG. 8 and has been moved leftwardly with respect to FIG. 7. In alternative embodiment, the rotation axis 465 may be translated along a higher number of paths, in a plurality of directions, and an orientation of the rotation axis 465 may be adjusted by the adjustment mechanism 470 or by another adjustment mechanism independent from the adjustment mechanism 470. In the same or another embodiment, the rotatable reflective prism 460 and the pivotable galvo mirror 450 are arranged such that the position of the rotatable reflective prism 460 may be adjusted along the third degree of freedom independently from the first and second degrees of freedom of the pivotable galvo mirror 450, and such that the position of the pivotable galvo mirror 450 may be adjusted along the first and/or the second degree of freedom independently from the third degree of freedom of the rotatable reflective prism 460. In other words, any adjustment along the first, second and third degrees of freedom individually and/or along any combination thereof can be made.

It should be noted that translations and rotations between the positions of the pivotable galvo mirror 450 and between the positions of the rotatable reflective prism 460 are exaggerated in the FIGS. 4 to 8 and are merely an aid to understanding the present technology. It is contemplated that ranges of these translations and rotations can be different and depending on inter alia the configuration of the system and its purpose, and that the ranges can vary with specific implementations of this technology.

As it will be described in greater details herein after, it should also be noted that adjusting, by the adjustment mechanism 470, the position of the pivotable galvo mirror 450 relative to the rotatable reflective prism 460 may be made in an iterative manner. For example, if determination is made that a self-flashing effect occurs when the pivotable galvo mirror 450 rotates within the angular range, the adjustment mechanism 470 may be configured to adjust the position of the pivotable galvo mirror 450 along the circular path 485 and around the light source beam axis 477 until no self-flashing effect occurs when the pivotable galvo mirror 450 rotates within the angular range. In other words, the calibration of the LIDAR system may be performed, at least in part, by iteratively adjusting a position of the pivotable galvo mirror 450 along the two degrees of freedom until no self-flashing effect occurs when the pivotable galvo mirror 450 rotates within the angular range.

Detection Unit

Referring back to FIG. 3 and according to certain non-limiting embodiments of the present technology, the detection unit 306 is communicatively coupled to the controller 310 and may be implemented in a variety of ways. According to the present technology, the detection unit 306 includes a photodetector, but could include (but is not limited to) a photoreceiver, optical receiver, optical sensor, detector, optical detector, optical fibers, and the like. As mentioned above, in some non-limiting embodiments of the present technology, the detection unit 306 may be configured to acquire or detects at least a portion of the input beam 316 and produces an electrical signal that corresponds to the input beam 316. For example, if the input beam 316 includes an optical pulse, the detection unit 306 may produce an electrical current or voltage pulse that corresponds to the optical pulse detected by the detection unit 306.

It is contemplated that, in various non-limiting embodiments of the present technology, the detection unit 306 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the detection unit 306 may also include circuitry that performs signal amplification, sampling, filtering, signal conditioning, analog-to-digital conversion, time-to-digital conversion, pulse detection, threshold detection, rising-edge detection, falling-edge detection, and the like. For example, the detection unit 306 may include electronic components configured to convert a received photocurrent (e.g., a current produced by an APD in response to a received optical signal) into a voltage signal. The detection unit 306 may also include additional circuitry for producing an analog or digital output signal that corresponds to one or more characteristics (e.g., rising edge, falling edge, amplitude, duration, and the like) of a received optical pulse.

In various embodiment, the detection unit 306 is configured to detect an occurrence of the self-flashing effect by measuring an energy of the input beam 316 (e.g. a luminous intensity or an illuminance) above a predetermined threshold power. In response to detection, by the detection unit 306, of a self-flashing effect, the controller 310 may cause the calibration procedure to be performed. As previously described, the calibration procedure may be iteratively performed until no self-flashing effect is detected by the detection unit 306 for each angular position of the first reflective component 350.

Developers of the present technology have realized that a position of the first reflective component 350 and the second reflective component 360 may vary based on inter alia moisture, temperature, movement, etc. Consequently, it is desired to continuously calibrate and/or adjust the one or more operational parameters of the scanning unit during operation of the LIDAR system for ensuring the quality of data generated by the LIDAR system.

In the context of the present technology, during the calibration process, an energy of the input beam 316 determined by the photodetector in response to a particular returning light beam is compared against a pre-determined threshold. More particularly, during the calibration process, the adjustment mechanism 370 of the scanning unit 306 is configured to adjust a position of the first reflective component 350 relative to the second reflective component 360 along two degrees of freedom such that, when the first reflective component 350 is actuatable amongst a first plurality of positions (e.g. angular position within the angular range), no self-flashing effect occurs.

Broadly speaking, in this embodiment, in response to detecting a self-flashing effect, a relative position and/or an orientation of the first reflective component 350 may be adjusted relatively to the second reflective component 360 along the two degrees of freedom by the adjustment mechanism 370.

How a given scanning unit as contemplated in some embodiments of the present technology is configured to generate this particular returning light beam causing the self-flashing effect for calibrating the detection unit will be discussed in greater details herein further below with reference to FIG. 9.

Controller

Depending on the implementation, the controller 310 may include one or more processors, an application-specific integrated circuit (ASIC), a field-programmable gate array (FPGA), and/or other suitable circuitry. The controller 310 may also include non-transitory computer-readable memory to store instructions executable by the controller 310 as well as data which the controller 310 may produce based on the signals acquired from other internal components of the LIDAR system 300 and/or may provide signals to the other internal components of the LIDAR system 300. The memory can include volatile (e.g., RAM) and/or non-volatile (e.g., flash memory, a hard disk) components. The controller 310 may be configured to generate data during operation and store it in the memory. For example, this data generated by the controller 310 may be indicative of the data points in the point cloud of the LIDAR system 300.

It is contemplated that, in at least some non-limiting embodiments of the present technology, the controller 310 could be implemented in a manner similar to that of implementing the electronic device 210 and/or the computer system 100, without departing from the scope of the present technology. In addition to collecting data from the detection unit 306, the controller 310 could also be configured to provide control signals to, and potentially receive diagnostics data from, the light source 302 and the scanning unit 308.

As previously stated, the controller 310 is communicatively coupled to the light source 302, the scanning unit 308, and the detection unit 306. In some non-limiting embodiments of the present technology, the controller 310 may be configured to receive electrical trigger pulses from the light source 302, where each electrical trigger pulse corresponds to the emission of an optical pulse by the light source 302. The controller 310 may further provide instructions, a control signal, and/or a trigger signal to the light source 302 indicating when the light source 302 is to produce optical pulses indicative, for example, of the output beam 314.

Just as an example, the controller 310 may be configured to send an electrical trigger signal that includes electrical pulses, so that the light source 302 emits an optical pulse, representable by the output beam 314, in response to each electrical pulse of the electrical trigger signal. It is also contemplated that the controller 310 may cause the light source 302 to adjust one or more characteristics of output beam 314 produced by the light source 302 such as, but not limited to: frequency, period, duration, pulse energy, peak power, average power, and wavelength of the optical pulses.

By the present technology, the controller 310 is configured to determine a "time-of-flight" value for an optical pulse in order to determine the distance between the LIDAR system 300 and one or more objects in the field of view, as will be described further below. The time of flight is based on timing information associated with (i) a first moment in time when a given optical pulse (for example, of the output beam 314) was emitted by the light source 302, and (ii) a second moment in time when a portion of the given optical pulse (for example, from the input beam 316) was detected or received by the detection unit 306. In some non-limiting embodiments of the present technology, the first moment may be indicative of a moment in time when the controller 310 emits a respective electrical pulse associated with the given optical pulse; and the second moment in time may be indicative of a moment in time when the controller 310 receives, from the detection unit 306, an electrical signal generated in response to receiving the portion of the given optical pulse from the input beam 316.

In other non-limiting embodiments of the present technology, where the beam splitting element 304 is configured to split the output beam 314 into the scanning beam (not depicted) and the reference beam (not depicted), the first moment in time may be a moment in time of receiving, from the detection unit 306, a first electrical signal generated in response to receiving a portion of the reference beam. Accordingly, in these embodiments, the second moment in time may be determined as the moment in time of receiving, by the controller 310 from the detection unit 306, a second electrical signal generated in response to receiving an other portion of the given optical pulse from the input beam 316.

By the present technology, the controller 310 is configured to determine, based on the first moment in time and the second moment in time, a time-of-flight value and/or a phase modulation value for the emitted pulse of the output beam 314. The time-of-light value T, in a sense, a "round-trip" time for the emitted pulse to travel from the LIDAR system 300 to the object 320 and back to the LIDAR system 300. The controller 310 is thus broadly configured to determine the distance 318 in accordance with the following equation:

$$D = \frac{c \cdot T}{2},\qquad(1)$$

wherein D is the distance 318, T is the time-of-flight value, and c is the speed of light (approximately $3.0 \times 10^8$ m/s).

As previously alluded to, the LIDAR system 300 may be used to determine the distance 318 to one or more other potential objects located in the surroundings 250. By scanning the output beam 314 across the ROI 325 of the LIDAR system 300 in accordance with the predetermined scan pattern, the controller 310 is configured to map distances (similar to the distance 318) to respective data points within the ROI 325 of the LIDAR system 300. As a result, the controller 310 is generally configured to render these data points captured in succession (e.g., the point cloud) in a form of a multi-dimensional map. In some implementations, data related to the determined time of flight and/or distances to objects could be rendered in different informational formats.

As an example, this multi-dimensional map may be used by the electronic device 210 for detecting, or otherwise identifying, objects or determining a shape or distance of potential objects within the ROI 325 of the LIDAR system 300. It is contemplated that the LIDAR system 300 may be configured to repeatedly/iteratively capture and/or generate point clouds at any suitable rate for a given application.

Embodiments of Scanning Unit

Figure 9:
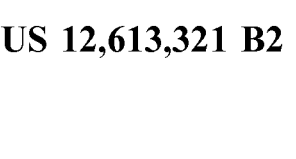
FIG. 9 depicts a schematic diagram of a further example LIDAR system implemented in accordance with certain non-limiting embodiments of the present technology.

In FIG. 9, there is depicted a schematic diagram of a LIDAR system 900 in accordance with at least some embodiments of the present technology. The LIDAR system 900 has a housing 930 with a window 980. There is also depicted a light source 902, a detection unit 906, and a scanning unit 908. The scanning unit 908 and the detection unit 906 are located inside the housing 930. The purpose of the housing 930 is to provide cover for the scanning unit 908 and the detection unit 906 from environmental light sources. Various components of the LIDAR system 900 may be implemented in a similar manner to components of the LIDAR system 300 without departing from the scope of the present technology.

The scanning unit 908 has a pivotable reflective component 950, a rotatable reflective component 960, and an adjustment mechanism 970. More particularly, the pivotable reflective component 950 is illustrated in three distinct positions namely, a first position 951, a second position 952, and a third position 953. The pivotable reflective component 950 is configured to pivot about a pivot axis 975 between a plurality of positions, including the first, the second, and the third positions 951, 952, and 953. In other words, the pivotable reflective component 950 may be actuated about the axis 975 within an angular range, thereby defining a plurality of angular positions for the pivotable reflective component 950.

The purpose of pivoting the pivotable reflective component 950 is to spread output beams along a first scanning axis. Light beams 971, 972, and 973 generated by the light source 902 are redirected by the pivotable reflective component 950 along the first scanning axis and depending on a given orientation of the pivotable reflective component 950 when the respective light beams 971, 972, and 973 contact the pivotable reflective component 950.

As seen in FIG. 9, the pivotable reflective component 950 is configured to redirect the light beam 971 and the light beam 972 towards the rotatable reflective component 960 when in the first position 951 and the second position 952 respectively, the rotatable reflective component 960 being rotatable about a rotation axis (not shown) during operation of the LIDAR system 900. In one embodiment, the rotatable reflective component 960 is a reflective multifaceted prism having four reflective surfaces. In another embodiment, the rotatable reflective component 960 is a reflective prism having six reflective surfaces. In yet other embodiments, the rotatable reflective component 960 is a reflective prism having a different number of reflective surfaces. In turn, the second reflective component 960 is configured to redirect the light beam 971 and the light beam 972 towards the environment through the window 980. Also, the light beam 973 falls on the rotatable reflective component 960 at a right angle (i.e. 90°) for given orientations of the rotatable reflective component 960 and is thus redirected towards the pivotable reflective component 950 when in the third position 953, instead of through the window 980 and towards the environment.

As previously described, the light beam 973 causes a blind spot to appear in the FOV of the LIDAR system 900 given that the light beam 973 does not travel in the environment of the LIDAR system 900. In other words, there is an area in the environment and comprised on the FOV of the LIDAR system that is not covered by the light beams emitted by the light source 902. Therefore, reflection, by the rotatable reflective component 960, of the light beam 973 towards the pivotable reflective component 950 instead of towards the environment causes a gap in the 3D map representation of the surrounding environment of the LIDAR system. As such, said gap may put the LIDAR system 900 and any system relying on the 3D map representation of the surrounding environment of the LIDAR system 900 at risk du to a partial lack of information (i.e. the gap) relative to the surrounding environment.

Moreover, as previously described, the light beam 973 has a relatively high energy given that the light beam 973 does not propagate in the environment. As such, the light beam 973, upon being reflected by the rotatable reflective component 960, may overflow and damage the detection 906 and, more specifically, an optical sensor thereof such as a photodetector.

In this embodiment, the LIDAR system comprises an adjustment mechanism 970 for adjusting a position of the pivotable reflective component 950 relative to the rotatable reflective component 960. The LIDAR system 900 may perform a calibration process using at least in part the adjustment mechanism 970 in order to prevent any self-flashing effect to occur when the pivotable reflective component 950 is actuated around the pivot axis 975.

In this embodiment, the adjustment mechanism 970 may adjusts a position of the pivotable reflective component 950 relatively to the rotatable reflective component 960 along two degrees of freedom. Alternative embodiments where said position is adjusted along a higher number of degrees of freedom are also contemplated.

More specifically, the adjustment mechanism 970 may translate and/or rotate the pivot axis 975 of the pivotable reflective component 950. In this embodiment, an adjustment of the position of the pivotable reflective component 950 relatively to the rotatable reflective component 960 along a first degree of freedom may shift the gap caused by the self-flashing effect relatively to the FOV, and a an adjustment of the position of the pivotable reflective component 950 relatively to the rotatable reflective component 960 along a second degree of freedom may adjust the FOV such that the gap is out of the FOV.

In the same or another embodiment, the adjustment mechanism 970 may adjust a position and/or an orientation of the rotatable reflective component 960 relatively to the LIDAR system 900 (e.g. relatively to the window 980). As an example, the adjustment mechanism 970 may translate and/or rotate the rotation axis of the rotatable reflective component 960 such that the rotatable reflective component 960 may be actuated (i.e. rotated in this embodiment) amongst an adjusted plurality of positions. The adjustment mechanism 970 may adjust the position and/or the orientation of the rotatable reflective component 960 along a third degree of freedom that may be, as an example, a translation of the rotation axis along a straight path. Alternative embodiments in which the adjustment mechanism 970 adjusts the position and/or the orientation of the rotatable reflective component 960 along a higher number of degrees of freedom are also contemplated.

In this embodiment, the calibration process is performed in an iterative manner such that the adjustment mechanism 970 adjusts a position of the pivotable reflective component 950 relatively to the rotatable reflective component 960 along one or both or the first and second degree of freedom until no self-flashing effect is detected when the pivotable reflective component 950 is actuated around the pivot axis 975 within the angular range (i.e. in the plurality of angular position). A method for calibrating LIDAR system 900 is described in greater details herein further below.

In at least some embodiments of the present technology, there is provided a given LIDAR system that has inter alia a housing, a scanning unit and a detection unit. The scanning unit includes a first reflective component and a second reflective component for scanning light beams generated by the LIDAR system. The first reflective component can be actuated between a range of positions about an actuation axis. In some cases, the actuation axis may be a rotational axis, while in other cases, the actuation axis may be a pivot axis and/or an oscillation axis. The range of positions may have at least one position in which the first reflective component reflects the light beam such that the light beam falls at a right angle (i.e. 90°) on the second reflective component and is reflected back to the first reflective component, thereby causing a self-flashing effect in the LIDAR system.

For example, during operation of the LIDAR system, the controller may be configured to actuate the first reflective component such that the first reflective component finds itself in each position of the range of positions, thereby causing a self-flashing effect in the LIDAR system when the light beam falls at a right angle on the second reflective component.

As a result, when actuated in the range of position, a self-flashing beam may be captured by the detection unit, thereby damaging the detection unit and leading to a blind spot representative of a lack of information relative to the environment of the LIDAR system. In the same example, during operation of the LIDAR system, the controller may be configured to cause an adjustment mechanism to adjust a position of the first reflective component such that the first reflective component may be actuated amongst an adjusted range of positions and that no self-flashing effect occurs when the first reflective component is actuated amongst the adjusted range of positions.

In at least some embodiments, it is contemplated that in a single scanning cycle of the LIDAR system (i.e. the first reflective component being actuated amongst an entirety of the range of positions), the controller in collaboration with the detection unit may determine occurrence of a self-flashing effect. In response to detection of a self-flashing effect, the controller may cause the adjustment mechanism to adjust a position of the first reflective component along one or both of the two degrees of freedom such that the first reflective component may be actuated amongst the adjusted range of positions.

It is also contemplated that the controller in collaboration with the detection unit may determine occurrence of a self-flashing effect may continue to detect self-flashing effects when the first reflective component is actuated amongst the adjusted range of positions. In response to detecting a self-flashing effect in this situation, the controller may further cause the adjustment mechanism to adjust, once again, a position of the first reflective component along one or both of the two degrees of freedom such that the first reflective component may be actuated amongst another adjusted range of positions. It is contemplated that data comprising information about position, rotational speeds, relative angles and other characteristics of the components of the LIDAR system may be generated and/or received by the controller and stored in a memory (e.g. memory 130) of the LIDAR system. In at least some embodiments, said information is stored with timestamps such that a temporal evolution of the characteristics of the components may be tracked. The calibration process may continue in such iterative manner until no self-flashing effect is detected when the first reflective component is actuated amongst the current range of positions. In the same or another embodiment, the calibration process may comprise computing positions of the first and second reflective components where no self-flashing effect occurs prior to performing the adjustments of the positions of the first and second reflective components. Said calculation may be, for example and without limitation, based on the information about relative positions, relative speeds (e.g. rotational speeds) of the components of the LIDAR system and, more specifically, of the scanning unit thereof. In alternative embodiments, a different configuration of the scanning unit may be applied by, for example and without limitation, changing a number of reflective faces of the second reflective component, placing the first and second reflective components at complex angles, introducing screening diaphragms in an optical path of the light beam, and/or physically overlapping the blind spot area.

It should also be noted that, due to environmental parameters such as moisture, temperature, movement, and the like, a relative position of the first and second reflective components may be altered. As such, the controller may continuously determine whether self-flashing effects occur when the LIDAR system is in use such that the adjustment mechanism may adjust a position of the first reflective component along one or both of the two degrees of freedom in response to detection of a self-flashing effect.

In some embodiments of the present technology, the LIDAR system may be configured to execute a method 1000, the schematic flowchart of which is depicted in FIG. 10. Various steps of the method 1000 will now be described.
Step 1002: Emitting, by the Light Source, the Light Beam Towards First Reflective Component The method 1000 begins at step 1002 with the light source of the LIDAR system emitting the light beam towards the first reflective component.

It is contemplated that in some embodiments of the present technology, the light source may include one or more laser diodes, including but not limited to: Fabry-Perot laser diode, a quantum well laser, a distributed Bragg reflector (DBR) laser, a distributed feedback (DFB) laser, or a vertical-cavity surface-emitting laser (VCSEL). For example, the light source may be implemented similarly to how the light source 302 is implemented. It is also contemplated that the light source may include one or more laser diodes that are current-modulated to produce optical pulses.

In this embodiment, the first reflective component may be a galvo mirror pivotable about a pivoting axis.
Step 1004: Actuating the First Reflective Component Amongst a First Plurality of Positions and a Second Reflective Component Amongst a Second Plurality of Positions The method 1000 continues to step 1004 with the LIDAR system configured to actuate the first reflective component amongst a first plurality of positions and a second reflective component amongst a second plurality of positions.

It is contemplated that in some embodiments of the present technology, there is envisioned a LIDAR system that has the first reflective component in the scanning unit that is configured to spread the light beams towards the second reflective component. For example, the first reflective component may be implemented similarly to how the reflective component 950 is implemented or how the pivotable galvo mirror 450 is implemented. The first plurality of positions is, in this embodiment and without limitation, a first plurality of angular positions defined in an angular range of the first reflective component around the pivot axis.

In this embodiment, the second reflective component may be a multifaceted prism and may be implemented similarly to how the reflective component 960 is implemented or how the rotatable reflective prism 460 is implemented. As an example, the second reflective component may be rotated at a constant speed set between 1 rotation per minute (r.p.m). and 200 r.p.m. around a rotation axis, thereby defining the plurality of second positions. Said speed may depend on characteristics of the LIDAR system and components thereof, such as a maximum frequency of the capture of data about surroundings of the LIDAR system.
Step 1006: Detecting, by a Detection Unit, a Self-Flashing Beam being the Light Beam Redirected by the Second Reflective Component Back Towards the First Reflective Component Instead of Towards an Environment The method 1000 continues to step 1006 with the LIDAR system configured to detect a self-flashing beam being the light beam redirected by the second reflective component back towards the first reflective component instead of towards an environment.

In this example, the light beams are redirected towards the second reflective component when the first reflective component is actuated amongst the range of positions described herein above. There may be one or more positions in the range of positions in which the light beam reflected by the first reflective component falls on the second reflective component at a right angle (i.e. 90°). Said light beam is therefore reflected back towards the first reflective component on the same optical path, thereby causing a self-flashing effect in the LIDAR system. Said light beam may be referred to as a "self-flashing beam".

The detection unit of the LIDAR system detects inter alia energy of light beams returning to the detection unit. In various embodiments, a self-flashing beam comprises is detected in response to acquiring, by the detection unit, a returning light beam with an energy above a pre-determined threshold.
Step 1008: In Response to the Detecting the Self-Flashing Beam, Adjusting, Using an Adjustment Mechanism, a Position of the First Reflective Component Relative to the Second Reflective Component Along at Least One of Two Degrees of Freedom Such that the First Reflective Component is Actuatable Amongst an Adjusted First Plurality of Positions The method 1000 continues to step 1006 with, in response to the detecting the self-flashing beam, the LIDAR system adjusting, using an adjustment mechanism, a position of the first reflective component relative to the second reflective component along at least one of two degrees of freedom such that the first reflective component is actuatable amongst an adjusted first plurality of positions.

In this embodiment, the adjustment mechanism adjusts a position (i.e. a relative position and orientation) of the first reflective component relatively to the second reflective component along two degrees of freedom. The adjustment mechanism may be implemented similarly to how the adjustment mechanism 470 is implemented or similarly to how the adjustment mechanism 770 is implemented. More specifically, the adjustment mechanism may adjust a position and/or an orientation of the pivoting axis of the first reflective component relatively to the second reflective component. As such, the first plurality of positions is adjusted such that the first reflective component may be actuated in another plurality of positions, or "adjusted first plurality of positions".

In various embodiments, the adjustment mechanism adjusts the pivoting axis of the first reflective component (e.g. a galvo mirror) along the at least one of the two degrees of freedom such the first reflective component is pivotable amongst the adjusted first plurality of positions about an adjusted pivoting axis. In the same or other embodiments, the adjustment mechanism adjusts the position of the first reflective component along both of the two degrees of freedom. Such adjustment along both of the two degrees of freedom may be made simultaneously or successively.

In one embodiment, the method 1000 further comprises, at step 1008, adjusting a position of the second reflective component (e.g. of the rotation axis thereof) along at least one degree of freedom such that the second reflective component is actuatable amongst a second adjusted plurality of positions.

In one embodiment, the method 1000 further comprises, once the first reflective component is actuatable in the adjusted first plurality of position, emitting by the light source an other light beam towards first reflective component and actuating the first reflective component amongst the adjusted first plurality of positions and the second reflective component amongst the second plurality of positions.

The detection unit may further detect occurrence of the self-flashing effect when the first reflective component is actuated amongst the adjusted first plurality of positions. As such, the method 1000 may comprise in response to detecting, by the detection unit of the LIDAR system, another self-flashing beam adjusting, by the adjustment mechanism, the position of the first reflective component relative to the second reflective component along the at least one of the two degrees of freedom such that the first reflective component is actuatable amongst another adjusted first plurality of positions. The operation of adjusting the position of the first reflective component may be further executed a number of time until no self-flashing beam is detected when the first reflective component is actuated amongst the current adjusted first plurality of positions. As such, the position of the first reflective component may be iteratively adjusted in response to detecting a self-flashing beam by the detection unit.

In this embodiment, adjustment of the position of the first reflective component by the adjustment mechanism may stop in response to determining that no light beam is redirected by the second reflective component back towards the first reflective component instead of towards the environment for each of the current adjusted plurality of positions for the first reflective component during operation of the LIDAR system.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of calibrating a Light detection and ranging (LIDAR) system, the LIDAR system mountable to a Self-driving car (SDC) operating in an environment, the LIDAR system having a light source, a detection unit, and a scanning unit, the scanning unit including:

a first reflective component for redirecting a light beam from the light source, the first reflective component being actuatable amongst a first plurality of positions;

a second actuatable reflective component for redirecting the light beam from the first reflective component towards the environment, the second reflective component being actuatable amongst a second plurality of positions; and an adjustment mechanism for adjusting a position of the first reflective component along two degrees of freedom;

the method comprising, during calibration of the LIDAR system:

emitting, by the light source, the light beam towards first reflective component;

actuating the first reflective component amongst the first plurality of positions and the second reflective component amongst the second plurality of positions;

detecting, by the detection unit, a self-flashing beam being the light beam redirected by the second reflective component back towards the first reflective component instead of towards the environment; and in response to the detecting the self-flashing beam, adjusting, using the adjustment mechanism, the position of the first reflective component relative to the second reflective component along at least one of the two degrees of freedom such that the first reflective component is actuatable amongst an adjusted first plurality of positions.

2. The method of claim 1, wherein the method further comprises:

emitting, by the light source, an other light beam towards first reflective component;

actuating the first reflective component amongst the adjusted first plurality of positions and the second reflective component amongst the second plurality of positions.

3. The method of claim 2, wherein the method further comprises:

detecting, by the detection unit, an other self-flashing beam being the other light beam redirected by the second reflective component back towards the first reflective component instead of towards the environment; and in response to the detecting the other self-flashing beam, adjusting, by the adjustment mechanism, the position of the first reflective component relative to the second reflective component along the at least one of the two degrees of freedom such that the first reflective component is actuatable amongst an other adjusted first plurality of positions.

4. The method of claim 2, wherein the method further comprises:

determining that no light beam is redirected by the second reflective component back towards the first reflective component instead of towards the environment; and use the adjusted plurality of positions for the first reflective component during operation of the LIDAR system.

5. The method of claim 1, wherein the first reflective component is a galvo mirror pivotable about a pivoting axis.

6. The method of claim 5, wherein the adjusting comprises adjusting, using the adjustment mechanism, the pivoting axis of the galvo mirror along the at least one of the two degrees of freedom such the galvo mirror is pivotable amongst the adjusted first plurality of positions about an adjusted pivoting axis.

7. The method of claim 1, wherein the second reflective component is a multifaceted prism.

8. The method of claim 1, wherein the detecting the self-flashing beam comprises acquiring by the detection unit a returning light beam with an energy above a pre-determined threshold.

9. The method of claim 1, wherein the adjusting the position of the first reflective component along the at least one of the two degrees of freedom comprises adjusting, using the adjustment mechanism, the position of the first reflective component along both of the two degrees of freedom.

10. The method of claim 1, wherein the adjusting comprises adjusting, using the adjustment mechanism, the position of the second reflective component relative to the LIDAR system along a third degree of freedom such that the second reflective component is actuatable amongst an adjusted second plurality of positions.

11. The method of claim 1, wherein one of the two degrees of freedom is an adjustment of the relative position of the first reflective component with respect to the second reflective component.

12. The method of claim 1, wherein one of the two degrees of freedom is an adjustment of the relative position of the first reflective component with respect to an axis of the light beam emitted by the light source towards the first reflective component.

13. A Light detection and ranging (LIDAR) system mounted to a Self-driving car (SDC) operating in an environment, the LIDAR system having a light source, a scanning unit, a detection unit, and a controller, the scanning unit comprising:

a first reflective component for redirecting a light beam from the light source, the first reflective component being actuatable amongst a first plurality of positions;

a second actuatable reflective component for redirecting the light beam from the first reflective component towards the environment, the second reflective component being actuatable amongst a second plurality of positions; and an adjustment mechanism for adjusting a position of the first reflective component relatively to the second reflective component along two degrees of freedom;

during calibration of the LIDAR system, the controller being configured to:

cause the light source to emit the light beam towards the first reflective component;

cause the first reflective component to actuate amongst the first plurality of positions and the second reflective component amongst the second plurality of positions;

detect, in collaboration with the detection unit, a self-flashing beam being the light beam redirected by the second reflective component back towards the first reflective component instead of towards the environment; and in response to a detection of the self-flashing beam, cause the adjustment mechanism to adjust the first reflective component relative to the second reflective component along at least one of the two degrees of freedom such that the first reflective component is actuatable amongst an adjusted first plurality of positions.

14. The LIDAR system of claim 13 wherein the controller is further configured to:

cause the light source to emit another light beam towards first reflective component;

cause the first reflective component to actuate amongst the adjusted first plurality of positions and the second reflective component to actuate amongst the second plurality of positions.

15. The LIDAR system of claim 14, wherein the controller is further configured to:

detect, in collaboration with the detection unit, an other self-flashing beam being the other light beam redirected by the second reflective component back towards the first reflective component instead of towards the environment; and in response to the detecting the other self-flashing beam, cause the adjustment mechanism to adjust the position of the first reflective component relative to the second reflective component along the at least one of the two degrees of freedom such that the first reflective component is actuatable amongst an other adjusted first plurality of positions.

16. The LIDAR system of claim 14, wherein the controller is further configured to:

determine that no light beam is redirected by the second reflective component back towards the first reflective component instead of towards the environment; and use the adjusted plurality of positions for the first reflective component during operation of the LIDAR system.

17. The LIDAR system of claim 13, wherein the first reflective component is a galvo mirror pivotable about a pivoting axis.

18. The LIDAR system of claim 17, wherein the adjusting comprises adjusting, using the adjustment mechanism, the pivoting axis of the galvo mirror along the at least one of the two degrees of freedom such the galvo mirror is pivotable amongst the adjusted first plurality of positions about an adjusted pivoting axis.

19. The LIDAR system of claim 13, wherein the second reflective component is a multifaceted prism.

20. The LIDAR system of claim 13, wherein the controller detects the self-flash beam upon acquiring, by the detection unit, a returning light beam with an energy above a pre-determined threshold.

* * * * *